(12) United States Patent
Chen

(10) Patent No.: US 9,554,307 B2
(45) Date of Patent: Jan. 24, 2017

(54) COMMUNICATION APPARATUS AND MOBILITY METHOD FOR MOBILE RELAY OF BACKHAUL LINKS

(75) Inventor: Peng Chen, Jiangsu (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 14/399,507

(22) PCT Filed: May 7, 2012

(86) PCT No.: PCT/CN2012/075125
§ 371 (c)(1),
(2), (4) Date: Nov. 6, 2014

(87) PCT Pub. No.: WO2013/166640
PCT Pub. Date: Nov. 14, 2013

(65) Prior Publication Data
US 2015/0131618 A1    May 14, 2015

(51) Int. Cl.
*H04W 36/00*    (2009.01)
*H04B 7/15*    (2006.01)
*H04W 16/02*    (2009.01)
*H04W 84/00*    (2009.01)
*H04B 7/155*    (2006.01)
(Continued)

(52) U.S. Cl.
CPC ........... *H04W 36/0055* (2013.01); *H04B 7/15* (2013.01); *H04B 7/155* (2013.01); *H04W 16/02* (2013.01); *H04W 84/005* (2013.01); *H04W 36/0033* (2013.01); *H04W 36/18* (2013.01); *H04W 84/047* (2013.01)

(58) Field of Classification Search
None
See application file for complete search history.

(56) References Cited

U.S. PATENT DOCUMENTS 9,258,745 B2 *  2/2016  Yu .................. H04W 36/00
2006/0229076 A1  10/2006  Monk
2007/0133500 A1   6/2007  Rajkotia et al.
(Continued)

FOREIGN PATENT DOCUMENTS

CN    101884174 A    11/2010
CN    102273242 A    12/2011
(Continued)

OTHER PUBLICATIONS

Extended European Search Report, Application No. 12876479.2, dated Dec. 3, 2015, 12 pages.
(Continued)

*Primary Examiner* — Robert C Scheibel
(74) *Attorney, Agent, or Firm* — NDWE LLP

(57) ABSTRACT

The present disclosure relates to a communication apparatus with multiple antenna sets installed on the radio interface between the communication apparatus and on-land base station, and a mobility method for the communication apparatus. In some embodiments, a communication apparatus may include a first antenna and a second antenna separated with a distance; and a digital unit connected to the first and second antennas and configured to support at least one backhaul context with the first antenna and at least another backhaul context with the second antenna at the same time.

10 Claims, 12 Drawing Sheets

(51) Int. Cl.
*H04W 36/18* (2009.01)
*H04W 84/04* (2009.01)

(56) References Cited

U.S. PATENT DOCUMENTS

| | | | | |
|---|---|---|---|---|
| 2012/0184317 A1* | 7/2012 | Ihm | H04L 5/0048 | 455/509 |
| 2012/0252355 A1* | 10/2012 | Huang | H04W 36/0033 | 455/7 |
| 2012/0315916 A1* | 12/2012 | Van Phan | H04W 36/08 | 455/442 |
| 2013/0172000 A1* | 7/2013 | Van Phan | H04W 16/26 | 455/450 |
| 2013/0195005 A1* | 8/2013 | Al-Shalash | H04W 36/16 | 370/315 |
| 2014/0226559 A1* | 8/2014 | Jactat | H04W 36/0055 | 370/315 |
| 2015/0016334 A1* | 1/2015 | Byun | H04W 36/08 | 370/315 |

FOREIGN PATENT DOCUMENTS

| | | |
|---|---|---|
| KR | 20110104864 A | 9/2011 |
| WO | 2011050840 A1 | 5/2011 |
| WO | WO-2013/166637 | 11/2013 |

OTHER PUBLICATIONS

Oumer Teyeb et al., "Dynamic Relaying in 3GPP LTE-Advanced Networks," 2009, 11 pages, EURASIP Journal on Wireless Communications and Networking, vol. 2009, Article ID 731317, Hindawi Publishing Corporation.

3GPP TSG RAN#52; RP-110894; Source: CATT, CMCC, CATR, China Telecom; Title: 'New Study Item Proposal: Mobile Relay for E-UTRA,' agenda item: 13.2, Bratislava, Slovakia, May 31-Jun. 3, 2011; 6 pgs.

3GPP; Technical Specification Group Radio Access Network; Evolved Universal Terrestrial Radio Access (E-UTRA); Radio Resource Control (RRC); Protocol specification (Release 9); 3GPP TS 36.331 V9.18.0; Jun. 2014; 265pgs.

PCT International Search Report and Written Opinion of the International Searching Authority for PCT Application No. PCT/CN2012/075125; mailed Feb. 28, 2013; 10pgs.

3GPP; Technical Specification Group Radio Access Network; Evolved Universal Terrestrial Radio Access (E-UTRA); Relay architectures for E-UTRA (LTE-Advanced); (Release 9); 3GPP TR 36.806 V9.0.0 (Mar. 2010), 34 pgs.

3GPP; Technical Specification, LTE; Evolved Universal Terrestrial Radio Access (E-UTRA); Radio Resource Control (RRC); Protocol specification; (3GPP TS 36.331 version 9.10.0 Release 9) Mar. 2012; 259pgs.

PCT International Preliminary Report on Patentability for International Application No. PCT/CN2012/075125, mailed Feb. 28, 2013; 5pgs.

Huawei, "Mobile Relay Solution by reusing Rel-10 Relay," Feb. 6-10, 2012, 4 pages, 3GPP TSG RAN WG3 #75 meeting, R3-120079, Dresden, Germany.

\* cited by examiner

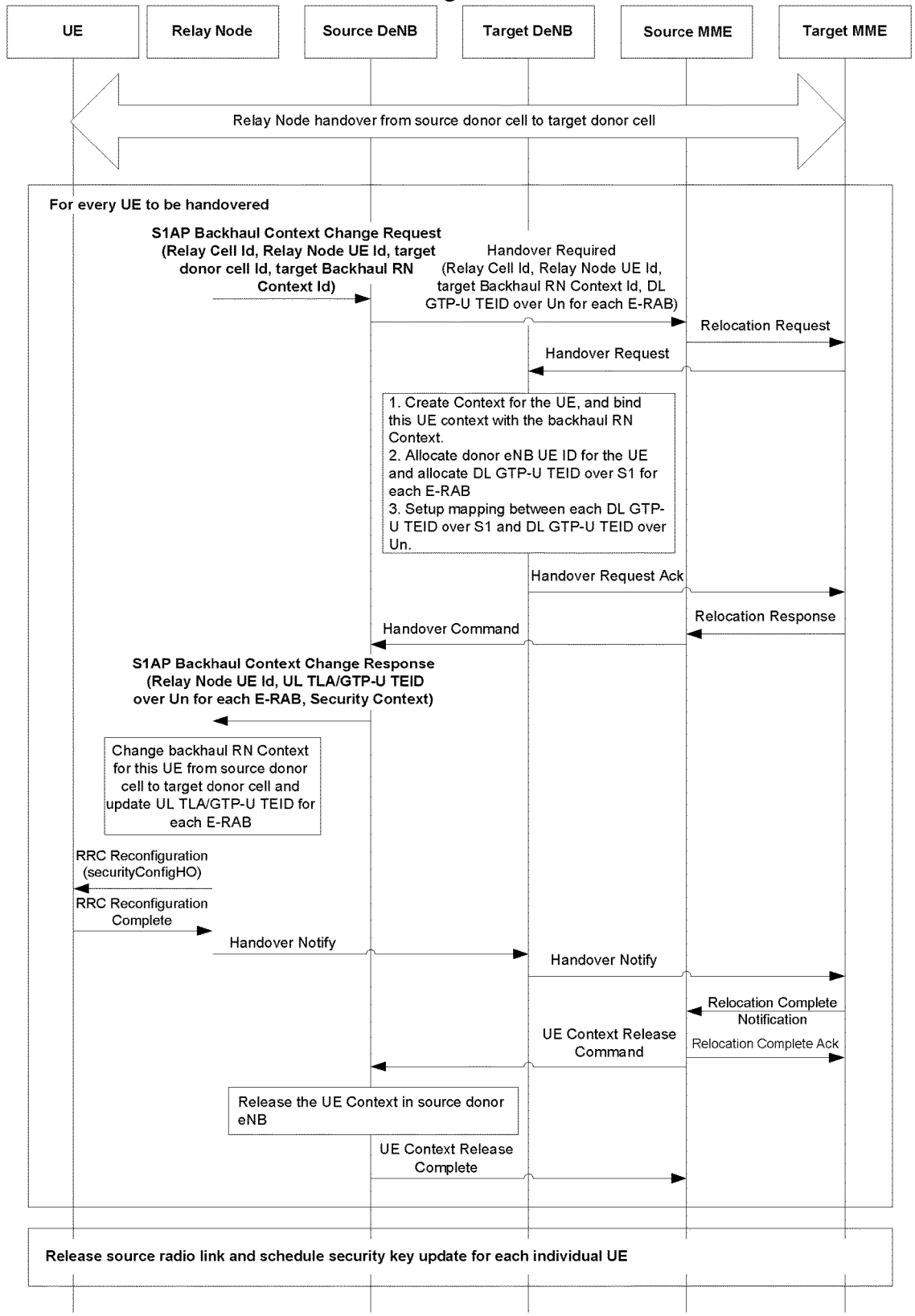

COMMUNICATION APPARATUS AND MOBILITY METHOD FOR MOBILE RELAY OF BACKHAUL LINKS

CROSS-REFERENCE TO RELATED APPLICATIONS

This application is a National stage of International Application No. PCT/CN2012/075125, filed May 7, 2012, which is hereby incorporated by reference.

TECHNICAL FIELD

The disclosure relates to wireless communication systems, and more particularly, to a communication apparatus with multiple antenna sets installed on the radio interface between the communication apparatus and on-land base station, and a mobility method for the communication apparatus.

BACKGROUND

Unless otherwise indicated herein, the approaches described in this section are not prior art to the claims in this application and are not admitted to be prior art by inclusion in this section.

High speed public transportation is being deployed worldwide at an increased pace. Hence, providing multiple services of good quality to users on high speed vehicles is important yet more challenging than typical mobile wireless environments also due to the following reasons:

Reduced Handover Success Rate: for high speed UEs, handover occurs much more frequently. With a mass of UEs performing handover at the same time, the handover success rate is reduced, due to excessive signaling overhead and the fact that tracking area update (TAU) is provided in a short time period. Furthermore, UE measurements in high speed environments are typically less accurate than low speed environments.

Degraded Throughput due to High Doppler Effects: impairments caused by high Doppler include frequency estimation errors and channel estimation errors. The achievable throughput with these impairments can be significantly reduced compared to low speed environment. Specific eNB/UE implementations to combat these impairments are possible, at the expense of additional cost.

To overcome the issues of reduced handover success rate and/or degraded throughput due to high Doppler effects, installing a communication apparatus on the train, and relaying the wireless communication between end user and on-land base station is one good candidate solution, wherein the relay communication apparatus can be either one Relay Node defined in 3GPP or one Wireless Router.

Mobile Relay is proposed in Reference [1] (RP-110894, 3GPP TSG RAN#52, May 31-Jun. 3, 2011). Mobile Relay is enhanced based on the Relay Node defined in Reference [2] (3GPP TS 36.806 V9.0.0, March, 2010).

According to definition for mobile relay in Reference [1], one of mobile relay's major characters is the capacity to support group mobility. The reason to support group mobility is that excessive handover signaling can be avoided by performing a group mobility procedure instead of individual mobility procedures for every UE, so handover success rate can be improved via mobile relays capable of group mobility.

Three major problems of the current RAN technology (including Relay Node defined in Reference [2]) in high speed public transportation scenario are listed as the following. With the Mobile Relay, the following problems can be overcome.

With a mass of UEs performing handover at the same time, the handover success rate is reduced, due to excessive signaling overhead in a short time period.

UE measurements in high speed environments are typically less accurate than low speed environments.

When the Relay Node moves to edge of two adjacent donor cells, the throughput of Relay Node in Un port will be very limited for the big path loss and high inter-cell interference.

Wireless Router is another kind of communication apparatus that can be used to relay wireless communication between end user and on-land base stations. The Wireless Router communicates with end user via WIFI, and communicates with the on-land base station via 3G (CDMA2000/TD-SCDMA/WCDMA) or LTE.

The current Wireless Router can only support one radio link between on-land base station and itself. So when one Wireless Router moves across the edge of two neighbor cells, the quality of the radio link will be very poor, and herein the supported throughput will be limited.

SUMMARY

According to the present disclosure, a communication apparatus with multiple antenna sets installed on the radio interface between the communication apparatus and on-land base station, and a mobility method for the communication apparatus are proposed.

In a first aspect of the present disclosure, there is provided a communication apparatus including: a first antenna and a second antenna separated with a distance; and a digital unit connected to the first and second antennas and configured to support at least one backhaul context with the first antenna and at least another backhaul context with the second antenna at the same time.

In some embodiments, the communication apparatus may function as a relay node (RN) between a base station (BS) and a user equipment (UE). For RN cases, the digital unit may include a signal strength measuring unit configured to measure signal strengths heard by the second antenna from a source donor cell and a target donor cell, wherein a UE is being served by the communication apparatus with a first backhaul RN context communicated by the first antenna with the source donor cell; a handover trigger event determining unit configured to determine that a handover trigger event occurs based on signal strength measurements; a backhaul context creating unit configured to create, for the target donor cell, a second backhaul RN context communicated by the second antenna with the target donor cell; a transceiver configured to send a backhaul RN context change request to the source donor cell and to receive a backhaul RN context change response from the target donor cell; and a backhaul context changing unit configured to change, for the UE, the first backhaul RN context to the second backhaul RN context, after the backhaul RN context change response is received.

In some other embodiments, the communication apparatus may function as a wireless router (WR) between a base station (BS) and a user equipment (UE). For WR cases, the digital unit may include a signal strength measuring unit configured to measure signal strengths heard by the second antenna from a source donor cell and a target donor cell, wherein a UE is being served by the communication apparatus with a first backhaul WR context communicated by the first antenna via a first IP tunnel, and the first IP tunnel is established between the first antenna and a Wireless Router Gateway (WR-GW) through the source donor cell; a handover trigger event determining unit configured to determine that a handover trigger event occurs based on signal strength measurements; an IP tunnel establishing unit configured to establish a second IP tunnel between the second antenna and the WR-GW through the target donor cell; a backhaul context creating unit configured to create a second backhaul WR context communicated by the second antenna via the second IP tunnel; a transceiver configured to send an IP tunnel change request to the WR-GW and to receive an IP tunnel change response from the WR-GW; and a backhaul context changing unit configured to change, for the UE, the first backhaul WR context to the second backhaul WR context, after the IP tunnel change response is received.

In a second aspect of the present disclosure, there is provided a mobility method for a communication apparatus with a first antenna and a second antenna separated with a distance, the mobility method including a step of supporting at least one backhaul context with the first antenna and at least another backhaul context with the second antenna at the same time.

In some embodiments, the communication apparatus may function as a relay node (RN) between a base station (BS) and a user equipment (UE). For RN cases, the mobility method may further include steps of: measuring signal strengths heard by the second antenna from a source donor cell and a target donor cell, wherein a UE is being served by the communication apparatus with a first backhaul RN context communicated by the first antenna with the source donor cell; determining that a handover trigger event occurs based on signal strength measurements; creating, for the target donor cell, a second backhaul RN context communicated by the second antenna with the target donor cell; sending a backhaul RN context change request to the source donor cell; receiving a backhaul RN context change response from the target donor cell; and changing, for the UE, the first backhaul RN context to the second RN backhaul context, after the backhaul RN context change response is received.

In some other embodiments, the communication apparatus may function as a wireless router (WR) between a base station (BS) and a user equipment (UE). For WR cases, the mobility method may further include steps of: measuring signal strengths heard by the second antenna from a source donor cell and a target donor cell, wherein a UE is being served by the communication apparatus with a first backhaul WR context communicated by the first antenna via a first IP tunnel, and the first IP tunnel is established between the first antenna and a Wireless Router Gateway (WR-GW) through the source donor cell; determining that a handover trigger event occurs based on signal strength measurements; establishing a second IP tunnel between the second antenna and the WR-GW through the target donor cell; creating a second backhaul WR context communicated by the second antenna via the second IP tunnel; sending an IP tunnel change request to the WR-GW; receiving an IP tunnel change response from the WR-GW; and changing, for the UE, the first backhaul WR context to the second backhaul WR context, after the IP tunnel change response is received.

In a third aspect of the present disclosure, there is provided a base station including a transceiver configured to receive a handover request including at least one of Relay Cell ID, Relay Node UE ID, a backhaul RN context ID, and DL GTP-U TEID over Un for each E-RAB, and send a handover request acknowledgement; a UE context creating unit configured to create a UE context for the UE, and binds this UE context with the second backhaul RN context; an ID allocating unit configured to allocates a DeNB UE ID for the UE, and allocate DL GTP-U TEID over S1 for each E-RAB; and a mapping unit configure to set up a mapping between each DL GTP-U TEID over S1 and DL GTP-U TEID over Un.

The embodiments of the present disclosure have at least one of the following benefits and advantages:

The maximum time interval allowed to execute one time of RN Handover is enlarged for the inventive Relay Node with multiple antenna sets. So, the big pressure of a mass of signaling transmission over S1/X2 interfaces and the heavy processing burden in source DeNB, target DeNB, source MME, and target MME can be eased.

Based on this disclosure, group mobility for Relay Node can be achieved via very limited changes on current standard.

Multiple automatic frequency control (AFC) circuits can be equipped within one relay communication apparatus (Relay Node or Wireless Router), each AFC circuit is associated with one antenna set, so the Doppler Frequency Shift of signals received from different direction can be correctly compensated, and the measurement accuracy in high speed scenario can thus be enhanced.

The inventive relay communication apparatus with multiple antenna sets can sufficiently utilize the length of train's cart (about 200 m) to get gain on signal's strength and thus can get higher throughput.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 10 shows a Sequence Diagram of Inter-MME RN Handover Procedure (via S1);

DETAILED DESCRIPTION OF EMBODIMENTS

Figure 1:
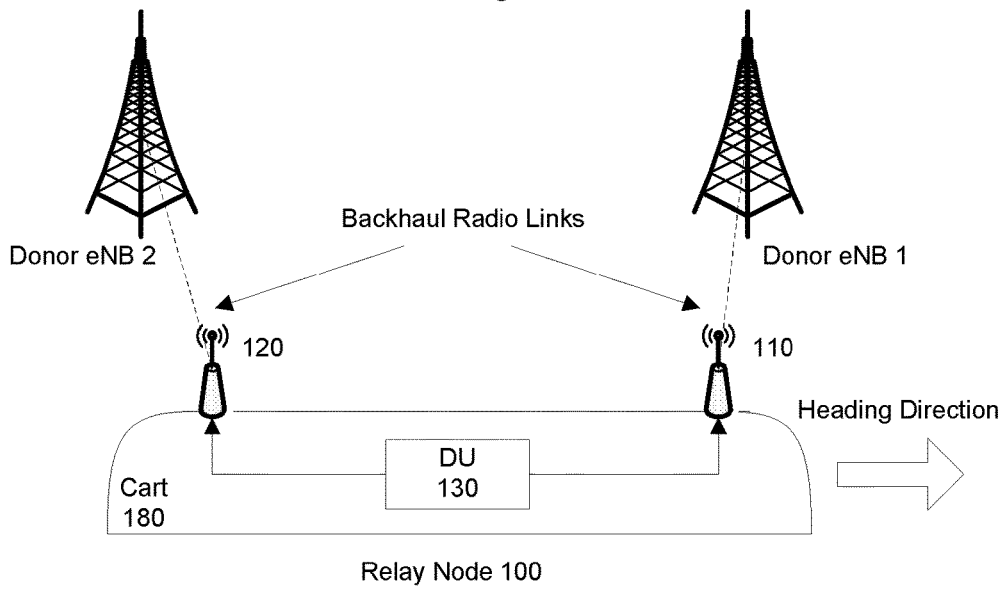
FIG. 1 shows a basic structure of a Relay Node 100 according to the present disclosure.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

The communication apparatus according to the present disclosure can be implemented via a relay node or a wireless router; however, the present invention is not limited thereto, for example, the present invention may be applied to other communication apparatus able to relay communications of a group of UEs currently available or developed in the future.

For example, the present disclosure can be exemplified in the context of mounting a relay node (RN) or a wireless router (WR) (examples of communication apparatus) with multiple antenna sets on a cart of a high speed train. Typically, the length of one cart of the high speed train is about 200 meters, and this length can provide good separation for multiple antenna sets. If the multiple antenna sets, with big separation distance between these antenna sets, can be installed for one Mobile Relay node, then one Mobile Relay node can maintain multiple backhaul radio links. With different backhaul radio links, the Mobile Relay node can communicate with different donor cells at the same time. As the antenna sets for different backhaul radio links are separated with long distances, there will be limited interference between these backhaul radio links, and the Mobile Relay node then is able to achieve better performance (e.g., higher cell edge throughput). Herein, the distance between the antenna sets may be set preferably, for example, by considering the length of the cart of the high speed train. The present invention is not limited to any specific value of the distance between the antenna sets; considering the application scenario, the distance between the antenna sets may be any value no more than a distance between two adjacent on-land base stations (e.g., eNBs).

In the present disclosure, multiple antenna sets are installed for the inventive Mobile Relay Node (e.g., Relay Node or Wireless Router), and correspondingly multiple backhaul radio links can be maintained between one Mobile Relay Node and on-land radio networks, with each backhaul radio terminated by a pair of Mobile Relay Node's antenna set and donor cell.

Example Relay Node

In the scenario of relay node, the relay node is used as an intermediate entity between a base station and UEs. Core Network (for example, SGSN and GGSN in 3G and MME in LTE system) is responsible for mobility management and session management of each Relayed UE.

For example, FIG. 1 shows a basic structure of a Relay Node 100 according to the present disclosure. As shown in FIG. 1, two antennas 110 and 120 are mounted at the front end and the back end of a cart 180 of a high speed train, and both antennas 110 and 120 are connected to one DU 130. One backhaul radio link can be established and maintained between the antenna 110 (Un port) and DeNB 1, and another backhaul radio link can be established and maintained between antenna 120 (Un port) and DeNB 2.

Figure 2:
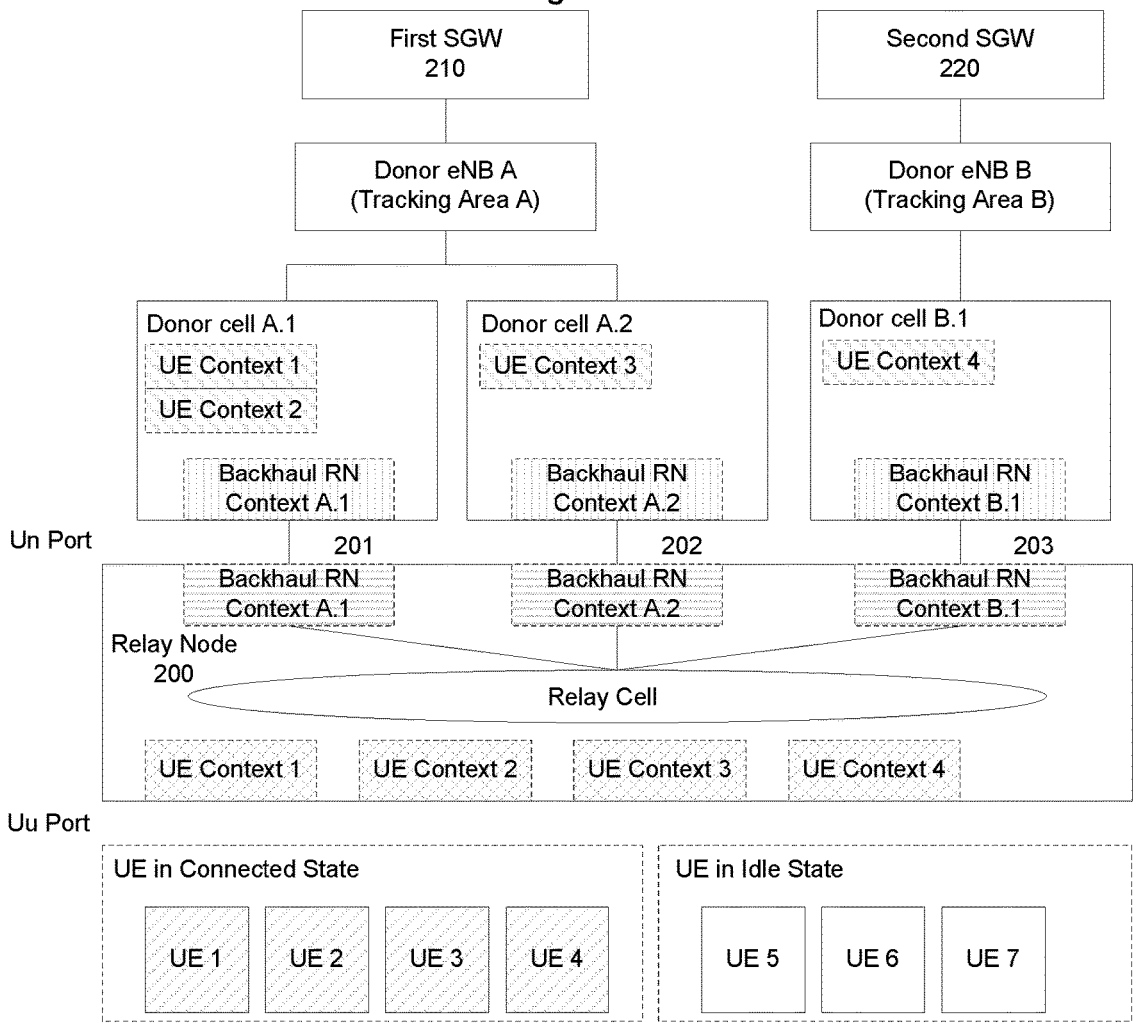
FIG. 2 shows a basic architecture for a Relay Node 200 according to the present disclosure.

FIG. 2 shows a basic architecture for a Relay Node 200 according to the present disclosure. As shown in FIG. 2, a first serving gateway (SGW) 210 is connected to DeNB A, and DeNB A may have two donor cells, Donor Cell A.1 and Donor Cell A.2; and a second SGW 220 is connected to DeNB B, and DeNB B may have only one donor cell, Donor Cell B.1. Relay Node 200 may have three antenna sets 201, 202 and 203 on Un port respectively being connected to Donor Cell A.1, Donor Cell A.2, and Donor Cell B.1. Therefore, multiple backhaul radio links are established and maintained. In this regard, multiple backhaul RN contexts (Backhaul RN Context A.1, Backhaul RN Context A.2, and Backhaul RN Context B.1) are supported in one Relay Node 200 on Un port, wherein each backhaul RN Context corresponds to one UE part Context created by the Relay Node 200. In one DeNB, multiple Backhaul RN Contexts can be supported for one Relay Node, wherein each Backhaul RN Context corresponds to one eNB part Context created by the DeNB for the Relay Node in each donor cell.

As an example, 7 UEs are also shown in FIG. 2.

UE1-UE4 are in ECM-Connected state, so RAN maintains contexts for each of these connected UE. The UE Context in Donor Cell is used to maintain the bounding relationship between the UE Context and its associated Backhaul RN Context and the following mapping relationship. Of course, some other necessary information such as security related information are also contained in the UE Contexts which is not illustrated herein.

Control Plane: DeNB UE Id, and Relay Node UE Id

User Plane: GTP-U TEID over S1, and GTP-U TEID over Un

The UE Context in Relay Node corresponds to eNB part Context created by Relay

Node for each connected state UE. It also maintains the bounding relationship between the UE Context and its associated Backhaul RN Context.

UE5-UE7 are in ECM-Idle state, so only MME maintain context for these three UE. RAN does not maintain any context for these three UE.

The concept of Backhaul RN Context in Relay Node and DeNB in Reference [2] can be adopted in the present disclosure. The only difference is that, in the present disclosure, one Relay Node can support multiple antenna sets, and correspondingly with each active antenna set, there is one pair of Backhaul RN Context created in the Relay Node and DeNB respectively.

There is no extra gain to maintain multiple Backhaul RN Contexts in one donor cell for one inventive Relay Node, unless MU-MIMO is supported in Un port. So in the following description of the present disclosure, an example scenario where one donor cell only maintains one Backhaul RN Context for an inventive Relay Node is described.

As shown in FIG. 2, as one Relay Node can support multiple Backhaul RN Contexts, so one Backhaul RN Context need to be selected and bound with one UE Context in Relay Node, wherein the UE Context means the eNB part UE Context for one Connected-State UE associated with this Relay Node.

At any time, one UE Context held in Relay Node is only bound to one Backhaul RN Context.
   Binding one UE Context with one Backhaul RN Context means when one uplink packet for one UE is received from Uu port, the packet will be transmitted to RAN via user plane of the bound Backhaul RN Context. But for downlink packets received from Un port, the received downlink packet will be routed the corresponding E-RAB based on the DL GTP-U TEID attached with this packet, no matter the packet is received from user plane of the bound Backhaul RN Context or not.

Also as shown in FIG. 2, as one DeNB can support multiple Backhaul RN Contexts for one Relay Node (different donor cell can hold different Backhaul RN Contexts for one RN), so one Backhaul RN Context needs to be selected and bound with one UE Context in the DeNB, wherein the UE Context is used to hold necessary UE specific context information and do the mapping between Control Plane/User Plane Id allocated in DeNB and Control Plane/User Plane Id allocated in Relay Node for one Connected-State UE associated with the Relay Node.

At any time, one UE Context held in the DeNB is only bound to one Backhaul RN Context.
   Binding one UE Context with one Backhaul RN Context means when one downlink packet for one UE is received from S1-U port, the packet will be transmitted to Relay Node via user plane of the bound Backhaul RN Context. But for uplink packets received from Un port, the received uplink packet will be routed the corresponding GTP-U tunnel based on the TLA/UL GTP-U TEID attached with this packet, no matter the packet is received from user plane of the bound Backhaul RN Context or not.

Figure 3:
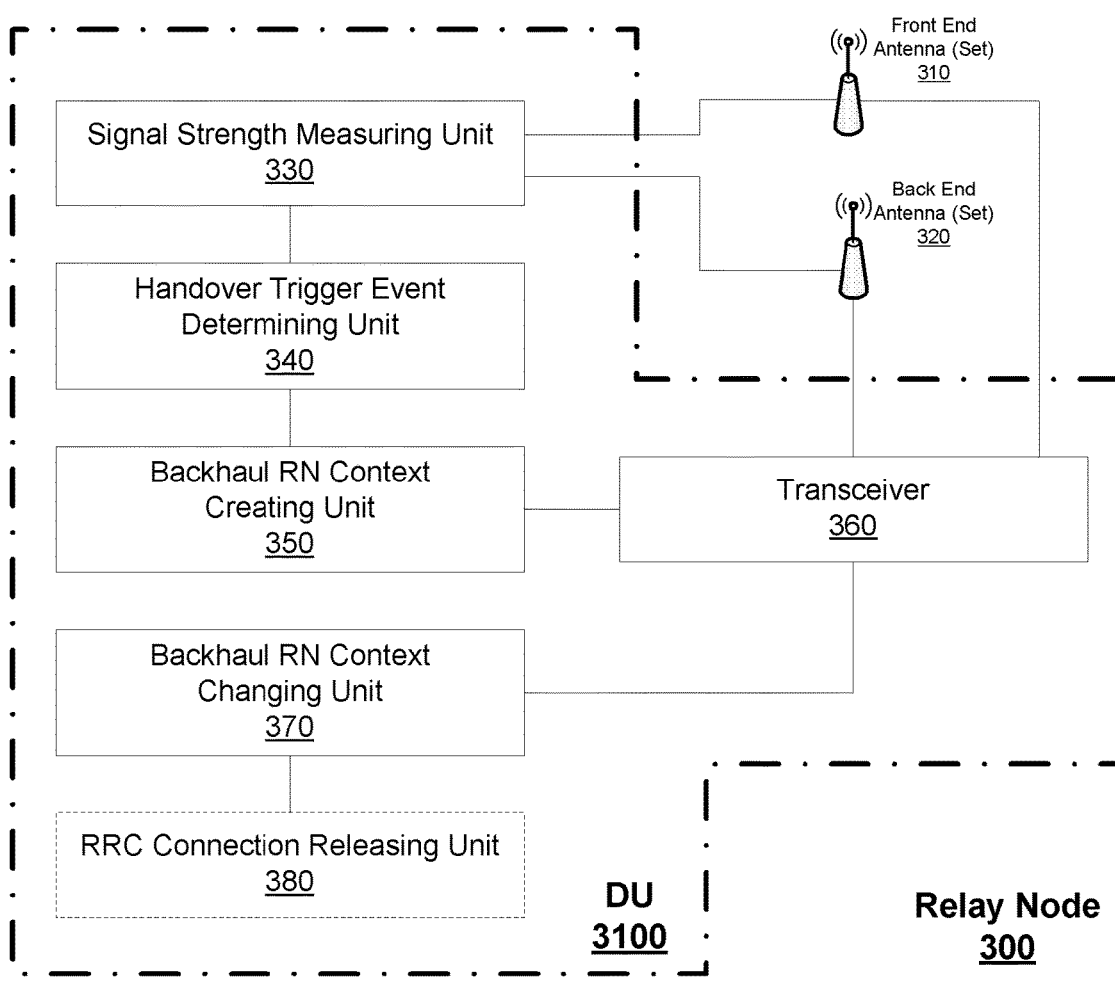
FIG. 3 shows a block diagram of a Relay Node 300 according to the present disclosure.

After introduction of multiple Un port antenna sets and multiple Backhaul RN Contexts, the operations of Relay Node will be described in detail as follows, for example,
   Relay Node's Structure
   Mobility Method performed by Relay Node
   Relay Node Handover Measurement
   Relay Node Handover Trigger Condition
   Relay Node Handover Procedure
   Relay Node's Backhaul Link Communication Relay Node's Structure FIG. 3 shows a block diagram of a Relay Node 300 according to the present disclosure.

As shown in FIG. 3, the Relay Node 300 includes a first Un port antenna (set) 310, a second Un port antenna (set) 320, and a digital unit (DU) 3100. DU 3100 may include a signal strength measuring unit 330, a handover trigger event determining unit 340, a backhaul RN context creating unit 350, a transceiver 360, and a backhaul RN context changing unit 370. As shown in dotted block, DU 3100 may optionally include an RRC connection releasing unit 380.

The first Un port antenna (set) 310 and the second Un port antenna (set) 320 are separated with a distance (for example, on a cart of a high-speed train). Per the distance between these two antennas (sets) 310 and 320, the present invention is not limited to any specific value. As a non-limiting example, the distance is no more than a distance between two adjacent on-land base stations. As another non-limiting example, the second Un port antenna (set) 320 is ahead of the first Un port antenna (set) 310 in the heading direction of movement of the train.

DU 3100 is connected to the first and second Un port antennas (sets) 310 and 320 so that DU3100 can support at least one backhaul RN context with the first Un port antenna (set) 310 and at least another backhaul RN context with the second Un port antenna (set) 320 at the same time. The detailed operations of respective units included in DU 3100 will be described hereunder.

The signal strength measuring unit 330 is used to measure signal strengths heard by the second Un port antenna 320 from a source donor cell and a target donor cell. Also, the signal strength measuring unit 330 can be used to measure signal strengths heard by the first Un port antenna 310 from the source donor cell and the target donor cell. UE is being served by the Relay Node 300 with a first backhaul RN context communicated by the first Un port antenna 310 with the source donor cell.

The handover trigger event determining unit 340 is used to determine that a handover trigger event occurs based on signal strength measurements from the signal strength measuring unit 330. For example, the handover trigger event may be any of Trigger Event A3 "Neighbor becomes offset better than Serving", Trigger Event A4 "Neighbor becomes better than threshold", and Trigger Event A5 "Serving becomes worse than threshold1 and neighbor becomes better than threshold2" defined in §5.5.4 of Reference [3] (3GPP TS 36.331 V9.10.0, March, 2012).

The backhaul RN context creating unit 350 is used to create, for the target donor cell, a second backhaul RN context communicated by the second Un port antenna 320 with the target donor cell.

The transceiver 360 can be used to transmit and receive user plane data packets and/or control plane data packets to and from donor cell. In connection with the present invention, for example, the transceiver 360 inter alia can be used to send an S1AP backhaul context change request to the source donor cell and to receive an S1AP backhaul context change response from the target donor cell. The S1AP backhaul context change request may include at least one of Relay Cell ID, Relay Node UE ID, second backhaul RN context ID, and target donor cell ID. The S1AP backhaul context change response may include at least one of Relay Node UE ID and UL TLA/GTP-U TEID over Un for each E-RAB. For intra-eNB handover, the source donor cell and the target donor cell are served by one and the same eNB. For intra-MME inter-eNB handover, the source donor cell and the target donor cell are served by different eNBs under one and the same MME. For inter-MME handover, the source donor cell and the target donor cell are served by different eNBs under different MMEs.

The backhaul RN context changing unit 370 is used to change, for the UE, the first backhaul RN context to the second backhaul RN context, after the backhaul context change response is received by the transceiver 360. After the backhaul RN context change, the UE is now being served by the Relay Node 300 with the second backhaul RN context communicated by the second Un port antenna 320 with the target donor cell.

The optional RRC connection releasing unit 380 is used to release RRC connection between the first Un port antenna 310 and the source donor cell after all UE served by the Relay Node 300 with the first backhaul RN context are handed over to the second backhaul RN context.

Mobility Method Performed by Relay Node

Figure 4:
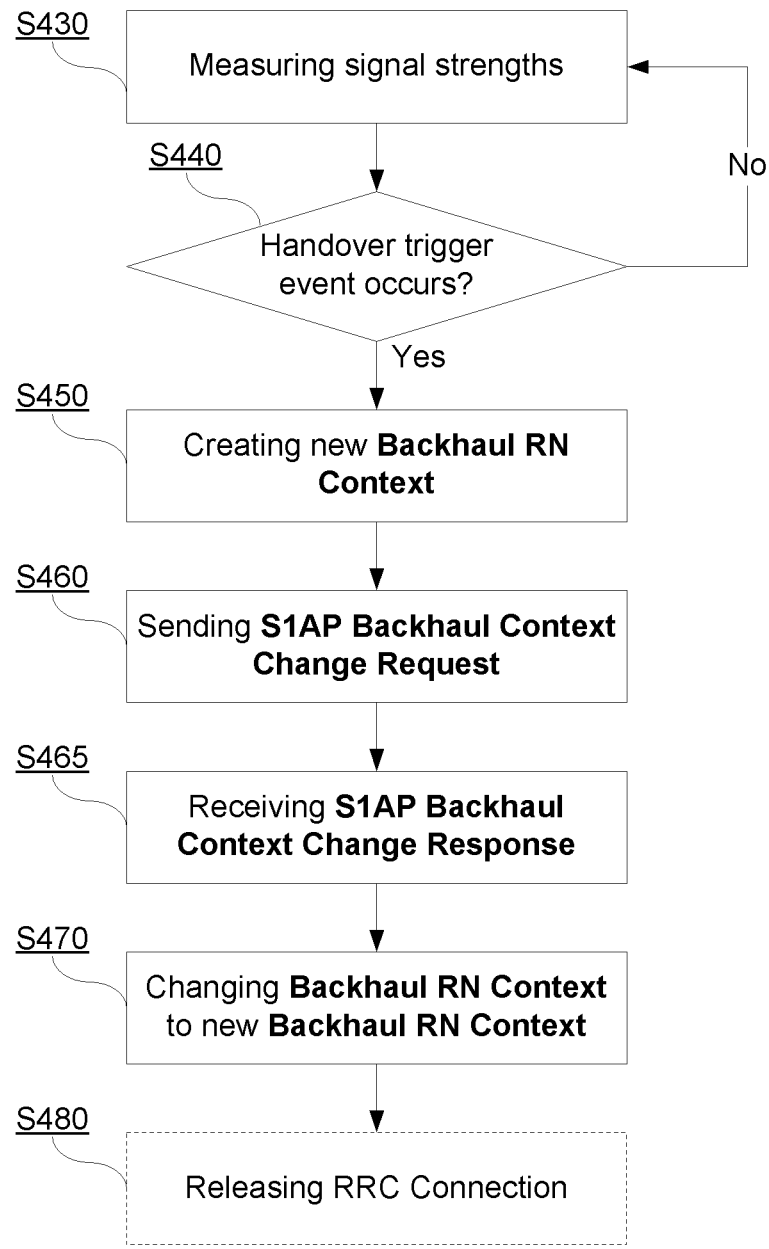
FIG. 4 shows a flowchart of a mobility method performed by the Relay Node 300 according to the present disclosure.

FIG. 4 shows a flowchart of a mobility method performed by the Relay Node 300 according to the present disclosure.

As shown in FIG. 4, in step S430, signal strengths heard by the second Un port antenna 320 from a source donor cell and a target donor cell are measured by the signal strength measuring unit 330. Now, UE is being served by the Relay Node 300 with a first backhaul RN context communicated by the first Un port antenna 310 with the source donor cell.

In step S440, it is determined by the handover trigger event determining unit 340 whether a handover trigger event occurs based on signal strength measurements from the signal strength measuring unit 330. For example, the handover trigger event may be any of Trigger Event A3 "Neighbour becomes offset better than Serving", Trigger Event A4 "Neighbour becomes better than threshold", and Trigger Event A5 "Serving becomes worse than threshold1 and neighbour becomes better than threshold2" defined in §5.5.4 of Reference [3] (3GPP TS 36.331 V9.10.0, March, 2012). The handover trigger event determining unit 340 determines whether the conditions of the handover trigger event are met. If so, the handover trigger event occurs (step S440: Yes), and the procedure goes to step S450. Otherwise, the handover trigger event does not occur (step S440: No), and the procedure returns to step S430.

In step S450, for the target donor cell, a second backhaul RN context communicated by the second Un port antenna 320 with the target donor cell is created by the backhaul RN context creating unit 350.

After the creation of the second backhaul RN context, an S1AP backhaul context change request is sent to the source donor cell by the transceiver 360 in step S460. In step S465, an S1AP backhaul context change response is received from the target donor cell by the transceiver 360.

In step S470, for the UE, the first backhaul RN context is changed to the second backhaul RN context by the backhaul RN context changing unit 370, after the backhaul context change response is received by the transceiver 360. After the backhaul RN context change, the UE is now being served by the Relay Node 300 with the second backhaul RN context communicated by the second Un port antenna 320 with the target donor cell.

After all UE served by the relay node with the first backhaul RN context are handed over to the second backhaul RN context, in step S480, RRC connection between the first Un port antenna and the source donor cell is released, for example, by the RRC connection releasing unit 380.

Relay Node Handover Measurement

Figure 5:
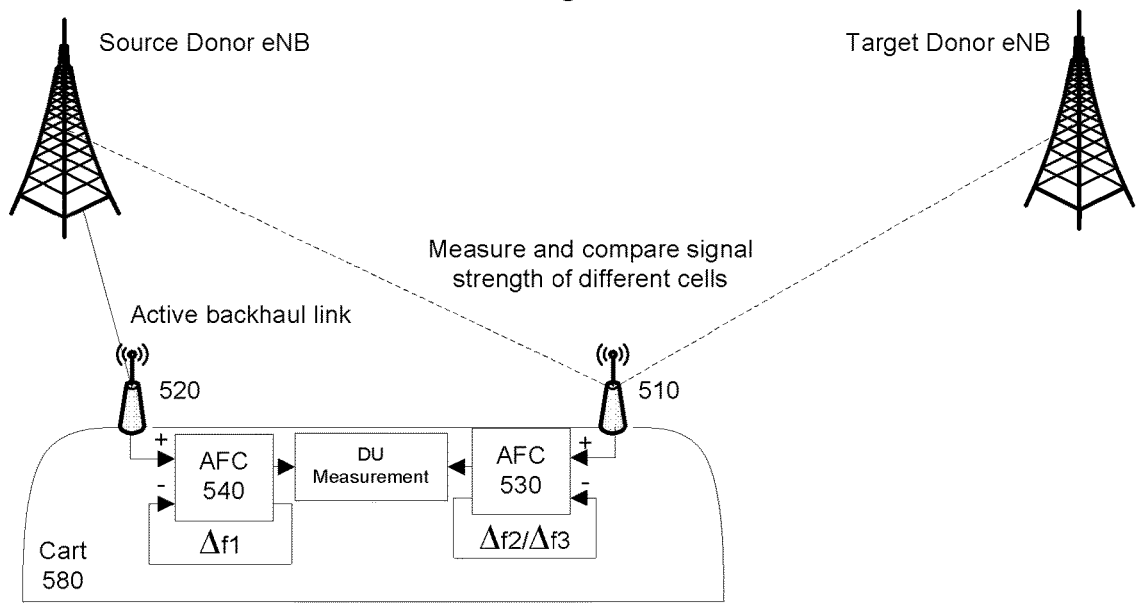
FIG. 5 is a schematic diagram illustrating relay node handover measurement.

FIG. 5 is a schematic diagram illustrating relay node handover measurement. As shown in FIG. 5, when a cart 580 of a train mounted with an inventive RN moves towards the boundary of two adjacent donor cells (respectively served by Source DeNB and Target DeNB), the RN can use one antenna set 520 near the Source DeNB (cell) to maintain backhaul radio link, use the other antenna set 510 to measure signal strength from these two adjacent donor cells, and use the measurement result to determine whether a new backhaul radio link between Target DeNB (cell) and the RN is to be established.

In FIG. 5, it can be seen that different automatic frequency control (AFC) circuits 530 and 540 are used for different Un port antenna sets. The left side antenna set 520 is used to maintain the backhaul radio link with Source DeNB, and the AFC circuit 540 associated with the antenna set 520 is used to compensate the Doppler Frequency Shift ($\Delta f1$) for signals heard from Source DeNB. The right side antenna set 510 is used to measure strengths of signals heard from two adjacent DeNBs, and the AFC circuit 530 associated with the antenna set 510 is used to compensate the Doppler Frequency Shift ($\Delta f2$) of signal from Source DeNB to the antenna set 510 and the Doppler Frequency Shift ($\Delta f3$) of signal from Target DeNB to the antenna set 510.

Because there is no active backhaul radio link maintained by the right side antenna set 510, so the antenna set 510 can use different sub-frames to measure strengths of signals from different DeNBs, and its associated AFC circuit 530 can thus compensate the corresponding Doppler Frequency Shifts in different sub-frames. As different Doppler Frequency Shifts are compensated for signals from Source and Target DeNBs respectively in different sub-frames, the measurement accuracy is thus enhanced.

The reason why the left side antenna set 520 is not used to measure signal strength is that, there is one active backhaul radio link maintained by the antenna set 520. In every sub-frame, the left side antenna set 520 needs to monitor signals from Source DeNB, so there is no idle period for its associated AFC circuit 540 to measure and compensate the Doppler Frequency Shift for signal from Target DeNB.

Relay Node Handover Trigger Condition

The normal handover trigger condition is designed for a terminal that has only one antenna set in radio interface (here one antenna set means a cluster of antennas with the separation distance between each antenna is no longer than several times of wave length). But one inventive relay node can be equipped with multiple Un port antenna sets, and the distance between these antenna sets are very big (usually more than 100 m), so the strength of same radio signal measured from each antenna sets are totally different (big difference in path loss and interference level), and the normal handover trigger condition is not suitable for the inventive relay node.

Figure 6:
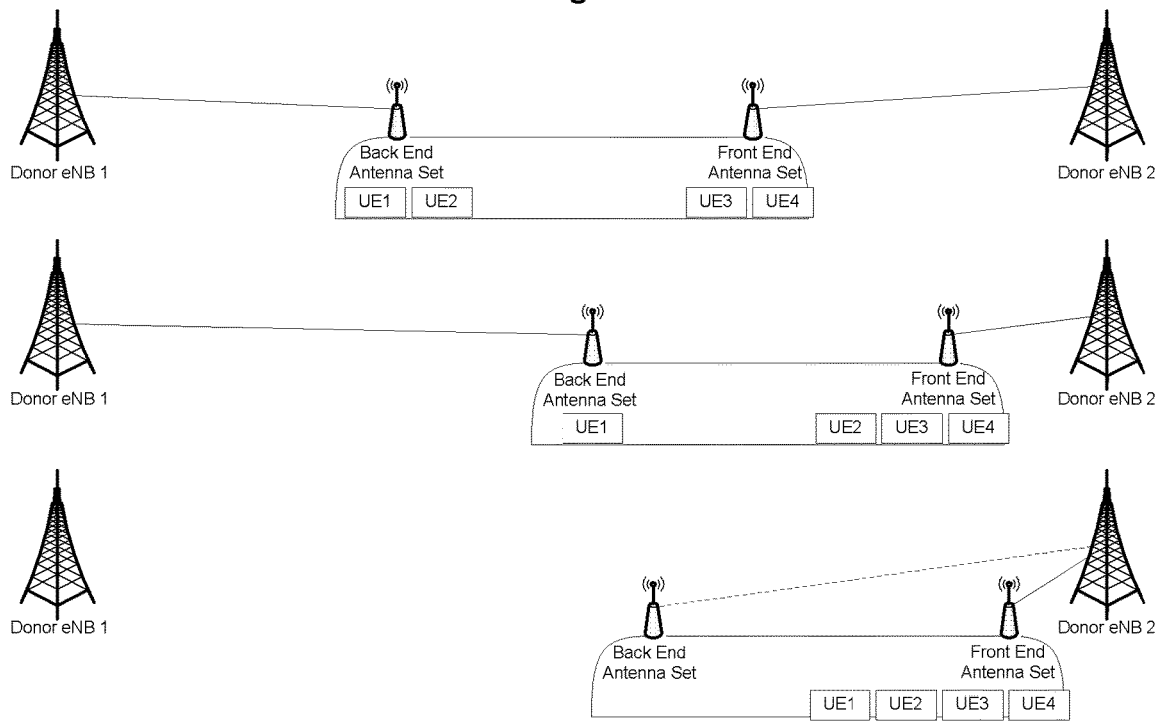
FIGS. 6 and 7 are schematic diagrams for illustrating relay node handover trigger conditions in the present disclosure, in which one example of one train moving between adjacent DeNBs is described in details.
Figure 7:
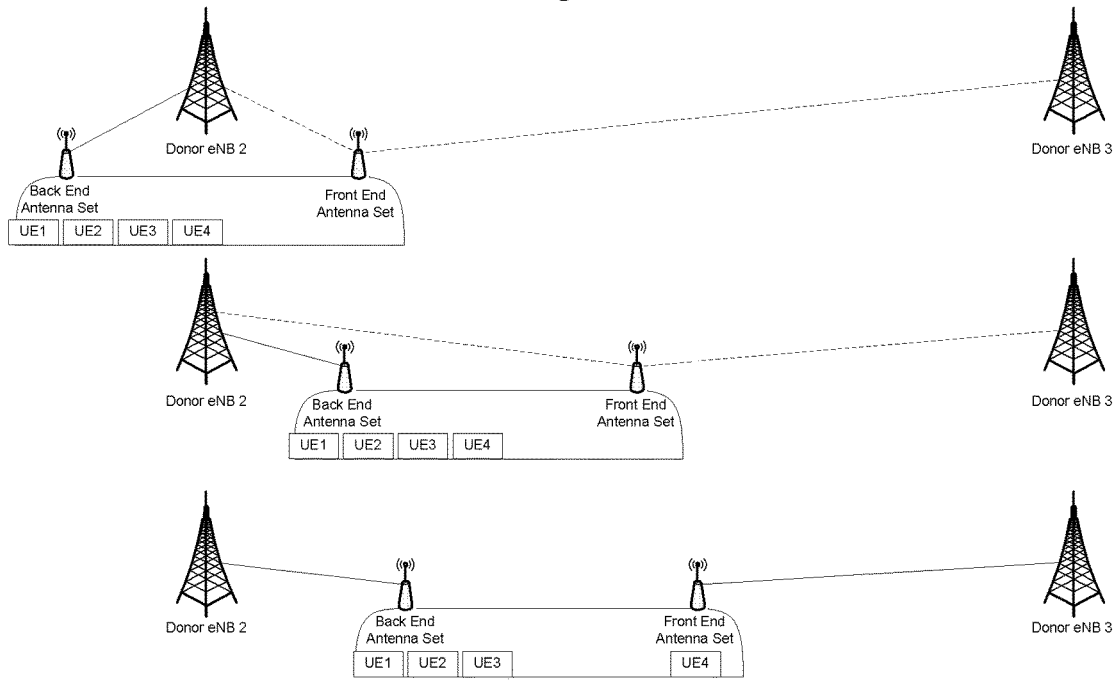

FIGS. 6 and 7 are schematic diagrams for illustrating relay node handover trigger conditions in the present disclosure, in which one example of one train moving between adjacent DeNBs is described in details to demonstrate how the handover can be triggered for the inventive relay node.

In FIG. 6, one train mounted with one inventive Relay Node is moving from coverage area of DeNB1 to coverage area of DeNB2.

When the train is on the way from DeNB1 to DeNB2 and locates at the middle point between these two DeNB, the Relay Node installed on the train maintains two radio links towards the two DeNB respectively. The first radio link is maintained between DeNB1 and Back End Antenna Set, and the second radio link is maintained between DeNB2 and the Frond End Antenna Set. The Relay Node maintains one Backhaul RN Context for each of these two radio links. Each Backhaul RN Context is bound with two UE Contexts.

When the train moves towards DeNB2, the Relay Node changes UE2's backhaul transmission from Backhaul RN Context for DeNB1 to Backhaul RN Context for DeNB2 according to changing of signal strength of the each backhaul radio link. When the train moves towards DeNB2 further, the Relay Node changes final UE's (UE1) backhaul transmission from Backhaul RN Context for DeNB1 to Backhaul RN Context for DeNB2.

After all UE Context's have been bound with the Backhaul RN Context towards DeNB2, the first radio link and its associated Backhaul RN Context are released. The Relay Node starts to measure the signal arrival time difference received at the point of the Front End Antenna Set and the Back End Antenna Set.

In FIG. 7, the train continues moving forward.

When the signal arrival time difference is smaller than one threshold, the Back End Antenna Set can be deemed as in sync with DeNB2 in uplink. Then Relay Node can change the terminate point of the backhaul radio link from the Frond End Antenna Set to the Back End Antenna Set. After change of antenna set, the Frond End Antenna Set starts to measure Strength of Signals from DeNB2 and DeNB3 respectively to evaluate whether it is needed to start the next hop handover.

During the signal strength measurement of the frond end antenna set, when the measurement report trigger condition met based on the Front End Antenna Set's measurement result (see below), the Relay Node will send measurement report to DeNB3 to trigger the handover, and after Relay Node received Reconfiguration message it will try to achieve uplink synchronization with DeNB3 via the Frond End Antenna Set, and create one new Backhaul RN Context for the new backhaul radio link.

After the new Backhaul RN Context is created, Relay Node will, by itself, decide when to change each associated UE's Backhaul RN Context from source DeNB to target DeNB (see below).

Here the measurement report triggering condition can choose any event defined in §5.5.4 of Reference [3] (3GPP TS 36.331 V9.10.0, March, 2012). If Event A3/A5 is selected, measurement of both source DeNB's signal strength and target DeNB's signal strength is needed. But if Event A4 is selected, only measurement for target DeNB's signal strength is needed. In case Event A4 is selected, the AFC circuit of Front End Antenna Set only needs to compensate Doppler Frequency Shift for signal from target DeNB.

The reason to let Relay Node to decide when to change Backhaul RN Context for each associated UE is that Relay Node knows the signaling strength status on both backhaul radio links, and thus knows how to best balance the load for each backhaul radio link.

Relay Node Handover Procedure

Because multiple antenna sets and RN backhaul contexts are introduced for the inventive Relay Node, there is some change on Relay Node's handover procedure. The major changing of Relay Node handover procedure focus on the following points:

During Relay Node handover, the inventive Relay Node needs to maintain two RN backhaul contexts in Un port. The source RN Backhaul Context can only be released after all associated UE's backhaul transmission have been changed to target RN backhaul context.

During Relay Node handover, Relay Node has the freedom to decide when to change each associated UE's backhaul transmission from source RN backhaul context to target RN backhaul context A new pair of S1AP message BACKHAUL CONTEXT CHANGE REQUEST/RESPONSE is introduced to facilitate the backhaul change for each associated UE.

With the above change on RN handover procedure, the maximum time interval allowed to execute one time of RN Handover is enlarged for an inventive Relay Node with multiple Un Antenna Sets. The allowed time interval to execute one time of RN Handover is about 2.4-3.6 seconds based on the following assumptions.

Suppose Event A3 is chosen as the measurement report trigger condition, and the network configure A3Offset and cellIndividualOffset to 0 dB, thus the RN Handover can be started when A3 Entering condition met based on the measurement result of the Frond End Antenna Set Suppose the RN Handover must be finished before A3 Entering condition met based on the measurement result of the Back End Antenna Set.

Suppose the typical length of one high speed train is 200 m, and the trains moving speed is about 200~300 km/h.

For example, if one train can convey 600 passengers, and each passenger holds one LTE terminal, then the Relay Node just needs to schedule about 2 UE's Backhaul Context Change every 10 ms, which is a very small pressure for DeNB and MME compared with the RN Handover for a Relay Node that only has one Un Antenna Set.

In this part, three typical Relay Node handover scenarios are discussed, and the innovation point for each kind of Relay Node handover procedures are highlighted with figures and corresponding procedure descriptions.

Figure 8:
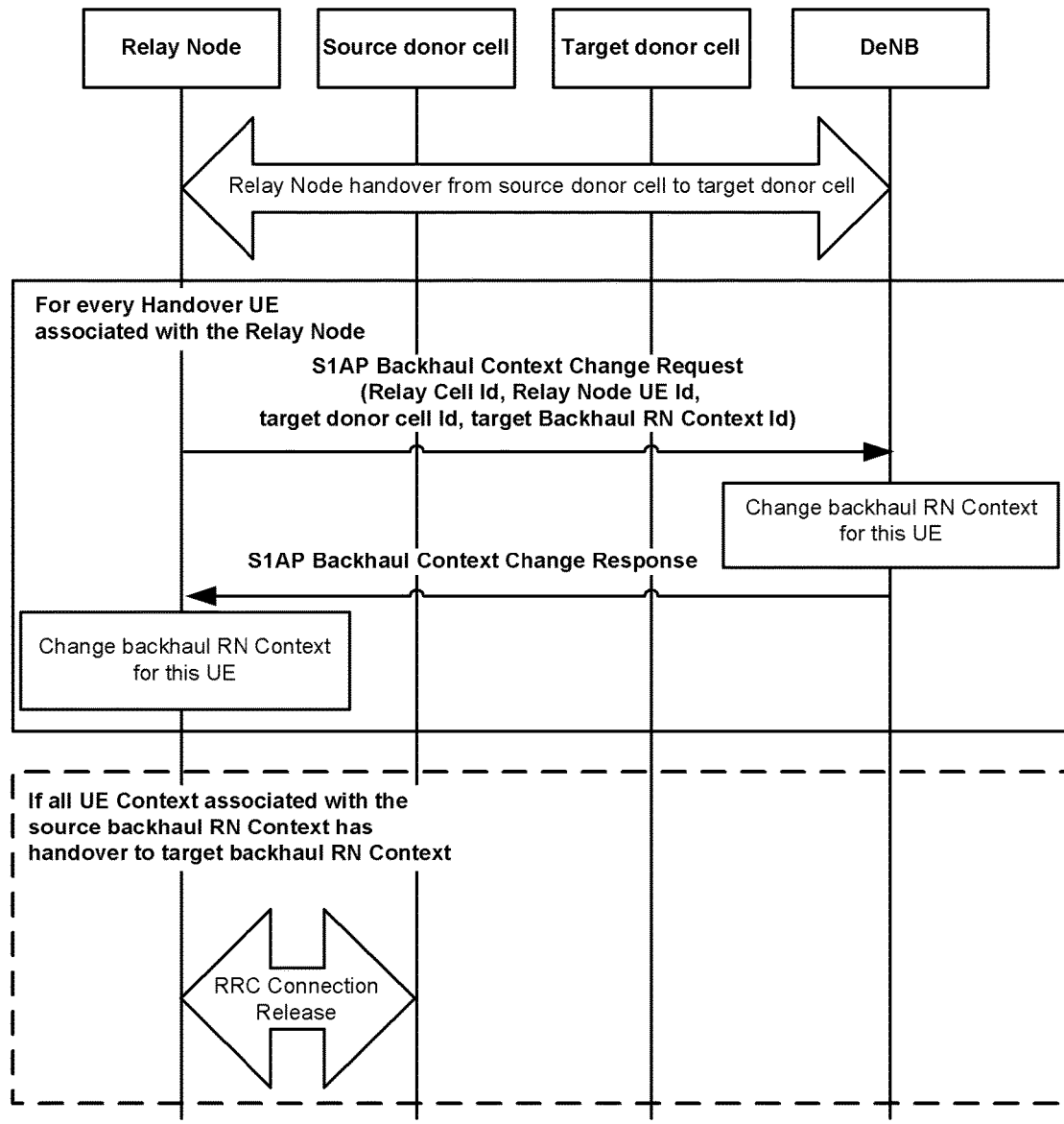
FIG. 8 shows a Sequence Diagram of Intra-eNB RN Handover Procedure.
Figure 9:
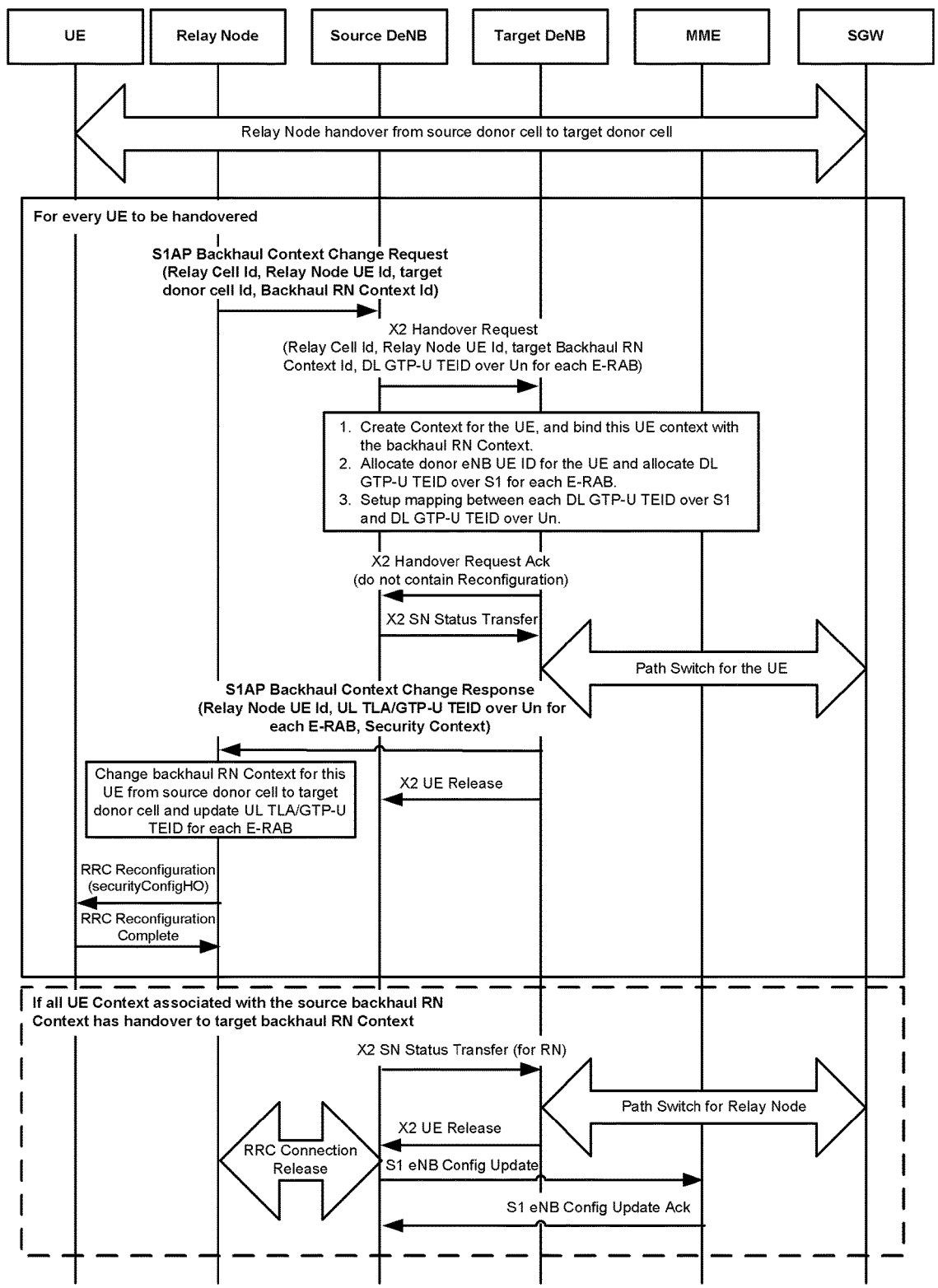
FIG. 9 shows a Sequence Diagram of Intra-MME Inter-eNB RN Handover Procedure (via X2)

Intra-eNB RN Handover Procedure (FIG. 8);
Intra-MME Inter-eNB RN Handover Procedure (via X2) (FIG. 9);
Inter-MME RN Handover (via S1) (FIG. 10).

Intra-eNB RN Handover Procedure

FIG. 8 shows a Sequence Diagram of Intra-eNB RN Handover Procedure.

As shown in FIG. 8,

In the first phase, a normal handover procedure from source donor cell to target donor cell for the Relay Node is conducted. When this procedure is finished, a new backhaul radio link between Relay Node (Front Antenna Set) and target donor cell is created, and uplink is synchronized for this radio link. Backhaul RN Context associated with the radio link is also created in Relay Node and DeNB respectively. It is to be noted that the backhaul RN Context associated with the old radio link is not deleted in this phase.

In the second phase, Relay Node will decide the time to trigger the changing of Backhaul RN Context for each UE Context associated with it. For example, the following steps are needed to change the Backhaul RN Context associated with one UE Context Relay Node sends one new introduced S1AP message (S1AP Backhaul Context Change Request) to DeNB, and the new message may carry at least one of the following parameters:
Relay Cell Id (ECGI of the relay cell serving the UE)
Relay Node UE Id (eNB UE Id allocated to UE by the Relay Node)
target donor cell Id (ECGI of the target donor cell)

target Backhaul RN Context Id (C-RNTI of the backhaul RN Context in target donor cell)

On reception of the request message, the DeNB updates the UE Context identified by the pair of (Relay Cell Id, Relay Node UE Id) and changes its associated Backhaul RN Context to the one identified by (target donor cell Id, target Backhaul RN Context Id).

After changing the Backhaul RN Context for the UE, DeNB sends response message to Relay Node.

On reception of the response message, the Relay Node updates the UE Context identified by the pair of (Relay Cell Id, Relay Node UE Id) and changes its associated Backhaul RN Context to the one identified by (target donor cell Id, target Backhaul RN Context Id).

In the third phase, after all UE Contexts associated with the source backhaul RN Context have been bound to target backhaul RN Context, the backhaul radio link between Relay Node and the source donor cell can be released.

Intra-MME Inter-eNB RN Handover Procedure
(Via X2)

FIG. 9 shows a Sequence Diagram of Intra-MME Inter-eNB RN Handover Procedure (via X2).

As shown in FIG. 9,

In the first phase, a normal handover procedure from source DeNB to target DeNB for the Relay Node is conducted. When this procedure is finished, a new backhaul radio link between Relay Node (Front Antenna Set) and target donor cell is created, and uplink is synchronized for this radio link. Backhaul RN Context associated with the backhaul radio link is also created in Relay Node and DeNB respectively. It is to be noted that the backhaul RN Context associated with the old radio link is not deleted in this phase. After Backhaul RN Context is created, SCTP association between the Relay Node and Target DeNB and the S1/X2 relation over this SCTP association are also built up.

In the second phase, Relay Node will decide the time to trigger changing of Backhaul RN Context associated for each UE Context associated with it. For example, the following steps are needed to change the Backhaul RN Context associated with one UE Context.

Relay Node sends Backhaul Context Change Request to source DeNB, and the new introduced request message may carry at least one of the following parameters:
Relay Cell Id (ECGI of the relay cell serving the UE)
Relay Node UE Id (eNB UE Id allocated to UE by the Relay Node)
target donor cell Id (ECGI of the target donor cell)
target Backhaul RN Context Id (C-RNTI of the backhaul RN Context in target donor cell)

When source DeNB receives the request message, it will trigger one normal X2 Handover for the selected UE, but in the X2 Handover Request Message, the following new information elements may be added. These information will be stored in the UE Context created in target DeNB for the selected UE:
Relay Cell Id (ECGI of the relay cell serving the UE)
Relay Node UE Id (eNB UE Id allocated to UE by the Relay Node)
target Backhaul RN Context Id (C-RNTI of the backhaul RN Context in target donor cell)
DL GTP-U TEID over Un for each E-RAB On receipt of X2 Handover Request message, the target DeNB takes the following actions:
Creating Context for the UE, and binding this UE context with the backhaul RN Context identified via target Backhaul RN Context Id;
Allocating DeNB UE ID for the UE and allocating DL GTP-U TEID over S1 for each E-RAB;
Setting up mapping between DeNB UE ID and Relay Node eNB Id; and
Setting up mapping between each DL GTP-U TEID over S1 and DL GTP-U TEID over Un.

After the above handling, target DeNB responses with X2 Handover Request Acknowledge to source DeNB, but no Target eNB To Source eNB Transparent Container is carried in the Ack message.

Target DeNB initiates one normal Path Switch procedure to change terminate point of GTP-U tunnel(s) for this UE from source eNB to target eNB.

After Path Switch for the selected UE, target DeNB sends S1AP Backhaul Context Change Response message to Relay Node to indicate Relay Node to update the associated Backhaul RN Context for the UE. The following parameters may be carried in the response message
Relay Node UE Id
UL TLA/GTP-U TEID over Un for each E-RAB
Security Context On receipt of this message, the Relay Node updates the UE Context identified by the pair of (Relay Cell Id, Relay Node UE Id) and changes its associated Backhaul RN Context to the one identified by (target donor cell Id, target Backhaul RN Context Id), and Relay Node also updates UL TLA/GTP-U TEID over Un for each E-RAB stored in the UE Context for the selected UE in Relay Node.

Relay Node may initiate RRC Reconfiguration procedure to the handover UE. Relay Node sends one RRC Reconfiguration Message containing IE SecurityConfigHO to UE to synchronize keys used for integrity protection and ciphering on Uu interface. UE responses with Reconfiguration Complete message upon completion of the key update.

In the third phase, after all UE Context bound with the source backhaul RN Context have been changed to target backhaul RN Context, Path Switch for the Relay Node will be conducted, and the radio link between Relay Node and the source donor DeNB will be released.

Inter-MME RN Handover (Via S1)

FIG. 10 shows a Sequence Diagram of Inter-MME RN Handover Procedure (via S1).

As shown in FIG. 10,

In the first phase, similar with intra-MME RN Handover, a normal S1 handover preparation from source DeNB to target DeNB for the Relay Node is conducted. After that a new Backhaul RN Context is created for the Relay Node in Relay Node and target DeNB respectively. It is to be noted that the backhaul RN Context associated with the old radio link is not deleted in this phase.

In the second phase, Relay Node will decide the time to trigger changing of Backhaul RN Context for each UE Context associated with it. For example, the following steps are needed to change the Backhaul RN Context associated with one UE Context.

Relay Node sends Backhaul Context Change Request to source DeNB, and the new introduced request message may carry at least one of the following parameters:
  Relay Cell Id (ECGI of the relay cell serving the UE)
  Relay Node UE Id (eNB UE Id allocated to UE by the Relay Node)
  target donor cell Id (ECGI of the target donor cell)
  target Backhaul RN Context Id (C-RNTI of the backhaul RN Context in target donor cell)

When source DeNB receives the request message, it will trigger one normal S1 Handover for the selected UE, but in the S1 Handover Required Message, the following new information elements may be added. These information will be stored in the UE Context created in target DeNB for the selected UE.
  Relay Cell Id (ECGI of the relay cell serving the UE)
  Relay Node UE Id (eNB UE Id allocated to UE by the Relay Node)
  target Backhaul RN Context Id (C-RNTI of the backhaul RN Context in target donor cell)
  DL GTP-U TEID over Un for each E-RAB On receipt of Handover Request message from the target MME (in response to the receipt of S1 Handover Required message, the source MME sends Relocation Request to the target MME; in response to the receipt of Relocation Request, the target MME sends Handover Request message to the target DeNB), the target DeNB take the following actions:
  Creating Context for the UE, and binding this UE context with the backhaul RN Context identified via target Backhaul RN Context Id;
  Allocating DeNB UE ID for the UE and allocate DL GTP-U TEID over S1 for each E-RAB;
  Setting up mapping between DeNB UE ID and Relay Node eNB Id; and
  Setting up mapping between each DL GTP-U TEID over S1 and DL GTP-U TEID over Un.

After the above handling, target DeNB responses with S1 Handover Request Acknowledge to source DeNB, but no Target eNB To Source eNB Transparent Container is carried in the Ack message.

On receipt of S1 Handover Command message, source DeNB sends S1AP Backhaul Context Change Response message to Relay Node to indicate Relay Node to update the associated Backhaul RN Context for the UE. The following parameters may be carried in the response message
  Relay Node UE Id
  UL TLA/GTP-U TEID over Un for each E-RAB
  Security Context On receipt of this message, the Relay Node updates the UE Context identified by the pair of (Relay Cell Id, Relay Node UE Id) and change its associated Backhaul RN Context to the one identified by (target donor cell Id, target Backhaul RN Context Id), and Relay Node also updates UL TLA/GTP-U TEID for each GTP Tunnel over Un port for the selected UE in Relay Node.

Relay Node may initiate RRC Reconfiguration procedure to the handover UE. Relay Node sends one RRC Reconfiguration Message containing IE SecurityConfigHO to UE to synchronize keys used for integrity protection and ciphering on Uu interface. UE responses with Reconfiguration Complete message upon completion of the key update.

After update the Backhaul RN Context association for the selected UE, the UE Context will be deleted from source DeNB.

Relay Node's Backhaul Link Communication

The Relay Node with multiple Un port Antenna set can sufficiently utilize the length of train's body (about 200 m) to get gain on radio signal's strength and thus can get higher throughput when the train on which the Relay Node mounted locates at edge of two donor cells.

Figure 11:
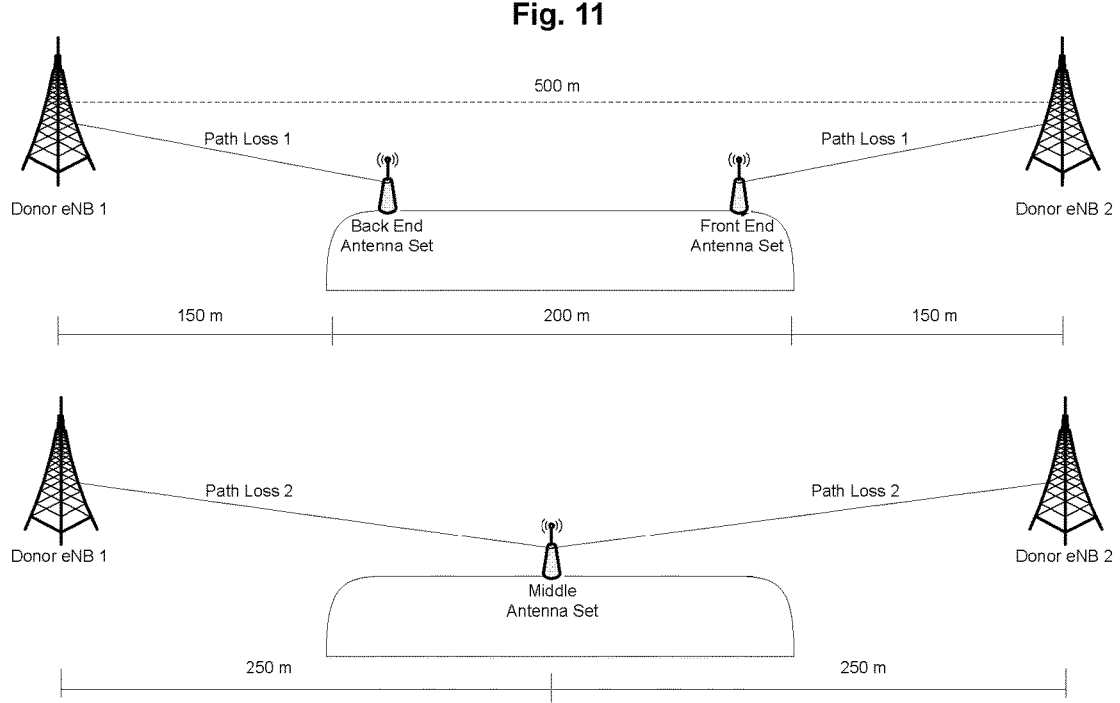
FIG. 11 is a schematic diagram for comparing the throughput difference between one Relay Node with two Un port antenna sets and one Relay Node with only one Un port antenna set.

We can use the example shown in FIG. 11 to compare the throughput difference between one Relay Node with two Un port antenna sets and one Relay Node with only one Un port antenna set.

Suppose the inter-site distance is 500 m, and two DeNB are deployed near the railway, see FIG. 11. When all of these two Relay Nodes stay at the middle point between two DeNBs, the distance between first RN's Antenna and DeNB's Antenna is 150 m, yet the distance between the second RN's Antenna and DeNB's Antenna is 250 m. So the path loss of the first Relay Node is smaller, the throughput over each radio link of the first Relay Node is higher. Furthermore, the first Relay Node can use two radio links to communicate with two DeNB respectively at the same time, so the first Relay Node can get more throughputs at cell edge.

Transverse one tunnel is another typical scenario that the inventive Relay Node on a train can get more throughput gain. For a RN with only one Un port Antenna Set, there will be one dark period when the train transverse the tunnel, during which no signals from DeNB can be received by the Relay Node for big penetration loss of hill. But for an inventive RN with two Un port antenna sets penetration loss is less. If the length of tunnel is not too long, there may be always on antenna that is outside of the tunnel. In such case the RN can use that antenna to communicate with the DeNB, and thus can get a better downlink GINR.

Example Mobile Wireless Router

In the scenario of wireless router, the wireless router is used as an intermediate entity between a base station and UEs. A new network entity Wireless Router Gate Way (WR-GW) is introduced.

Figure 12:
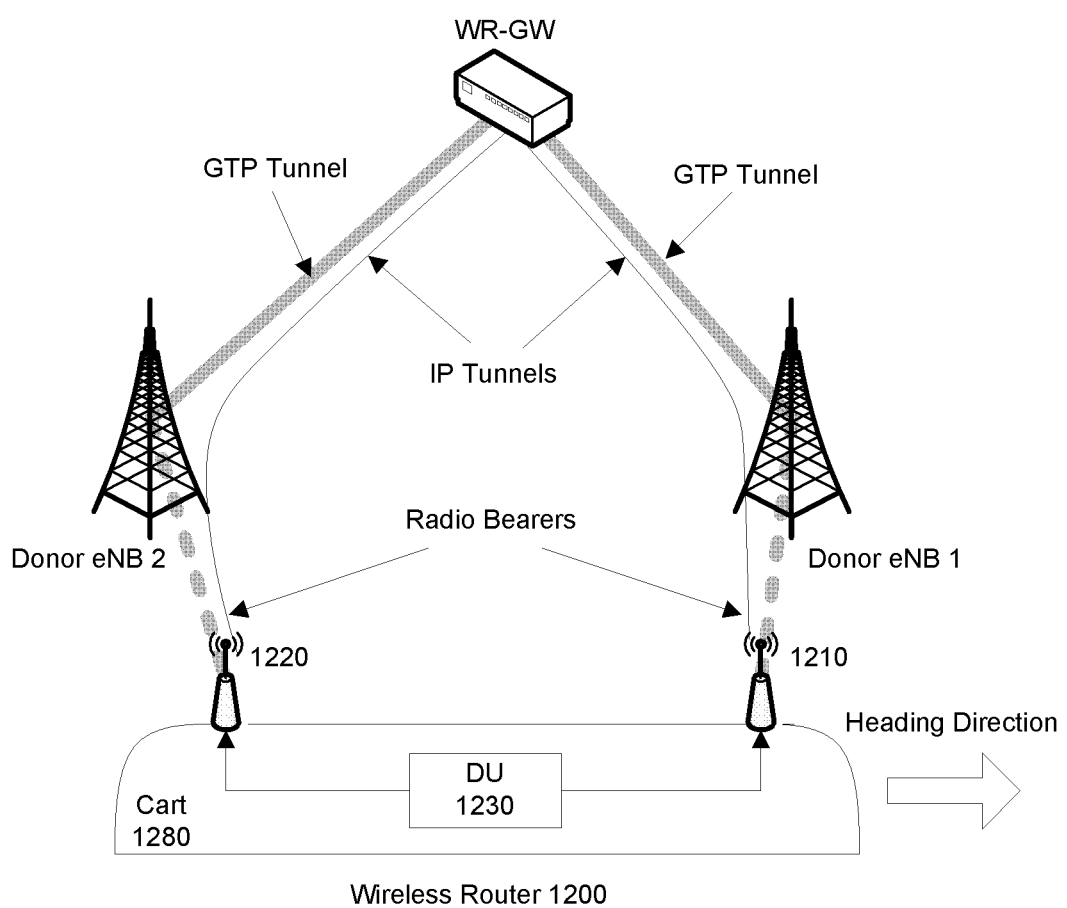
FIG. 12 shows a basic structure of a Wireless Router 1200 according the present disclosure.

For example, FIG. 12 shows a basic structure of a Wireless Router 1200 according the present disclosure. As shown in FIG. 12, two antennas 1210 and 1220 are mounted at the front end and the back end of a cart 1280 of a high speed train, and both antennas 1210 and 1220 are connected to one DU 1230. One IP tunnel (backhaul link) can be established and maintained between the antenna 1210 and WR-GW (via DeNB 1), and another IP tunnel (backhaul link) can be established and maintained between antenna 120 and WR-GW (via DeNB 2). Each IP link tunnel between Wireless Router 1220 and WR-GW goes through a radio bearer between antenna and DeNB and a GTP tunnel between DeNB and S/P-GW (cf. FIG. 13). With each IP tunnel, the Wireless Router 1200 can maintain one communication context, called as Backhaul WR Context in this disclosure.

Figure 13:
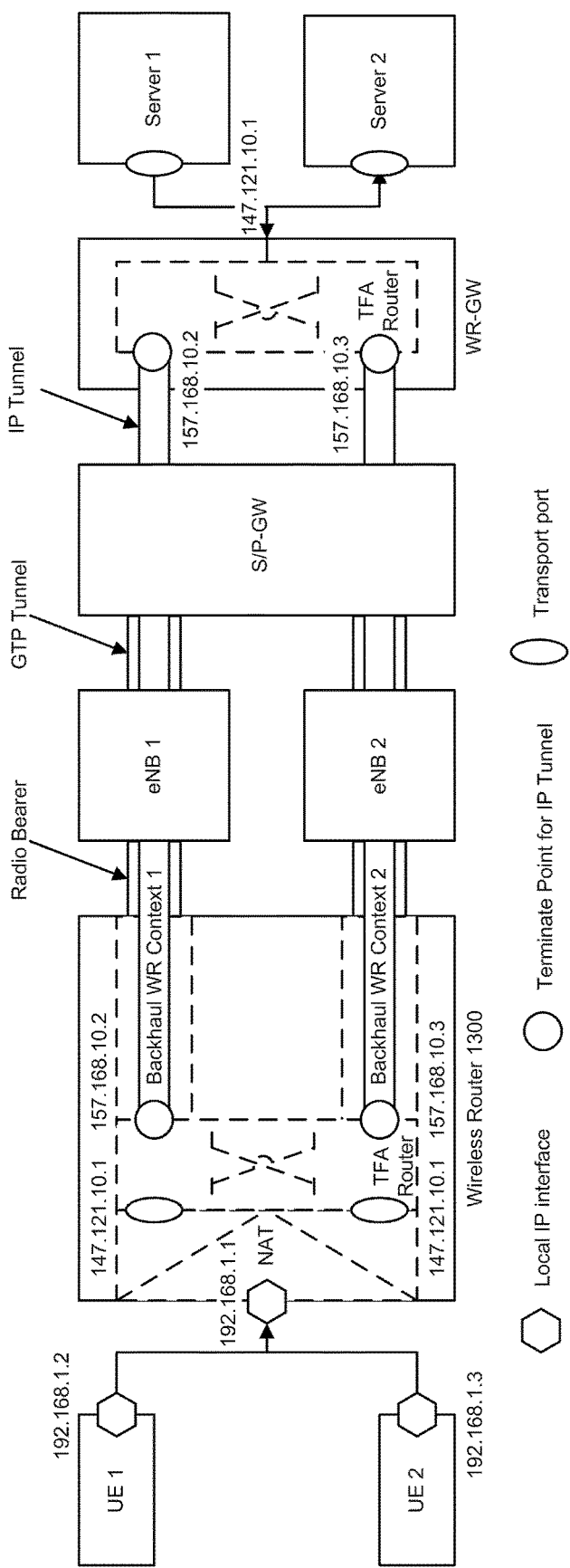
FIG. 13 shows a basic architecture for a Wireless Router 1300 according to the present disclosure.

FIG. 13 shows a basic architecture for a Wireless Router 1300 according to the present disclosure.

Mobile Wireless Router 1300 is one communication apparatus that relays the wireless communication between User Equipments and on-land base stations. It has two radio interfaces, one uplink radio interface used to communicate with on-land base station via 3G or LTE technology, and one downlink radio interface used to communicate with User Equipment via WiFi.

In this embodiment, one inventive Mobile Wireless Router 1300 may have multiple antenna sets on the uplink radio interface. With different antenna sets, the Mobile Wireless Router 1300 can communicate with different cells, and there will be different Backhaul WR Context associated with each antenna set. After attachment, Core Network will allocate one public IP address for each Backhaul WR Context of the Mobile Wireless Router 1300. In FIG. 13, the Mobile Wireless Router 1300 has two Backhaul WR Contexts, and thus two public IP addresses (157.168.10.2 and 157.168.10.3) are allocated to each of these Backhaul WR Contexts. One IP tunnel is created for each of the Backhaul WR context, and this IP tunnel is conveyed upon corresponding E-RAB and GTP-U tunnel (FIG. 12). To make Mobile Wireless Router 1300 be able to communicate with servers on Internet using one fixed IP address, during mobility of the Mobile Wireless Router, the WR-GW is introduced. The WR-GW allocates one IP address for each connected Mobile Wireless Router 1300. In FIG. 13, the Mobile Wireless Router 1300 is allocated with one IP address 147.121.10.1. Transportation of IP packets from and to 147.121.10.1 is conveyed over the IP tunnels created for each Backhaul WR Context.

On the downlink radio interface, the Mobile Wireless Router 1300 creates one Wireless LAN to serve User Equipments. The Mobile Wireless Router 1300 works as the default gateway of this Wireless LAN, and has Local IP address of 192.168.1.1, Each User Equipment connected with the Mobile Wireless Router 1300 will be allocated with one unique local IP address with this Wireless LAN. In FIG. 13, there are two User Equipments (UE 1 and UE 2), and each of them is allocated with one local IP address (192.168.1.2 and 192.168.1.3).

To make User Equipment be able to communicate with Servers outside of the Wireless LAN, the Mobile Wireless Router 1300 needs to do Network Address Translation (NAT) for each User Equipment. NAT will translate one local transport port (one transport port is IP address plus Transport Number) to one public transport port and vice versa. In FIG. 13, NAT will convert the transport port between 192.168.1.X::YY and 147.121.10.1::ZZ.

Both Mobile Wireless Router 1300 and WR-GW have the function of TFA router. TFA Router is to classify packets flows into different Traffic Flow Aggregate (TFA) according the configured Traffic Flow Template (TFT), and routes different TFA to corresponding IP tunnel terminated between Backhaul WR Context and WR-GW. As described above, Backhaul WR Context is one of the termination points of the IP tunnel. The other termination point of the IP tunnel locates in the WR-GW. Both Mobile Wireless Router 1300 and MR-GW need to change IP tunnel during Mobile Wireless Router's mobility. Wireless Router 1300 can inform WR-GW to select IP Tunnel for each TFA via an IP Tunnel Change Request message, and the WR-GW may acknowledge Wireless Router 1300 with an IP Tunnel Change Response message.

Wireless Router's Structure

Figure 14:
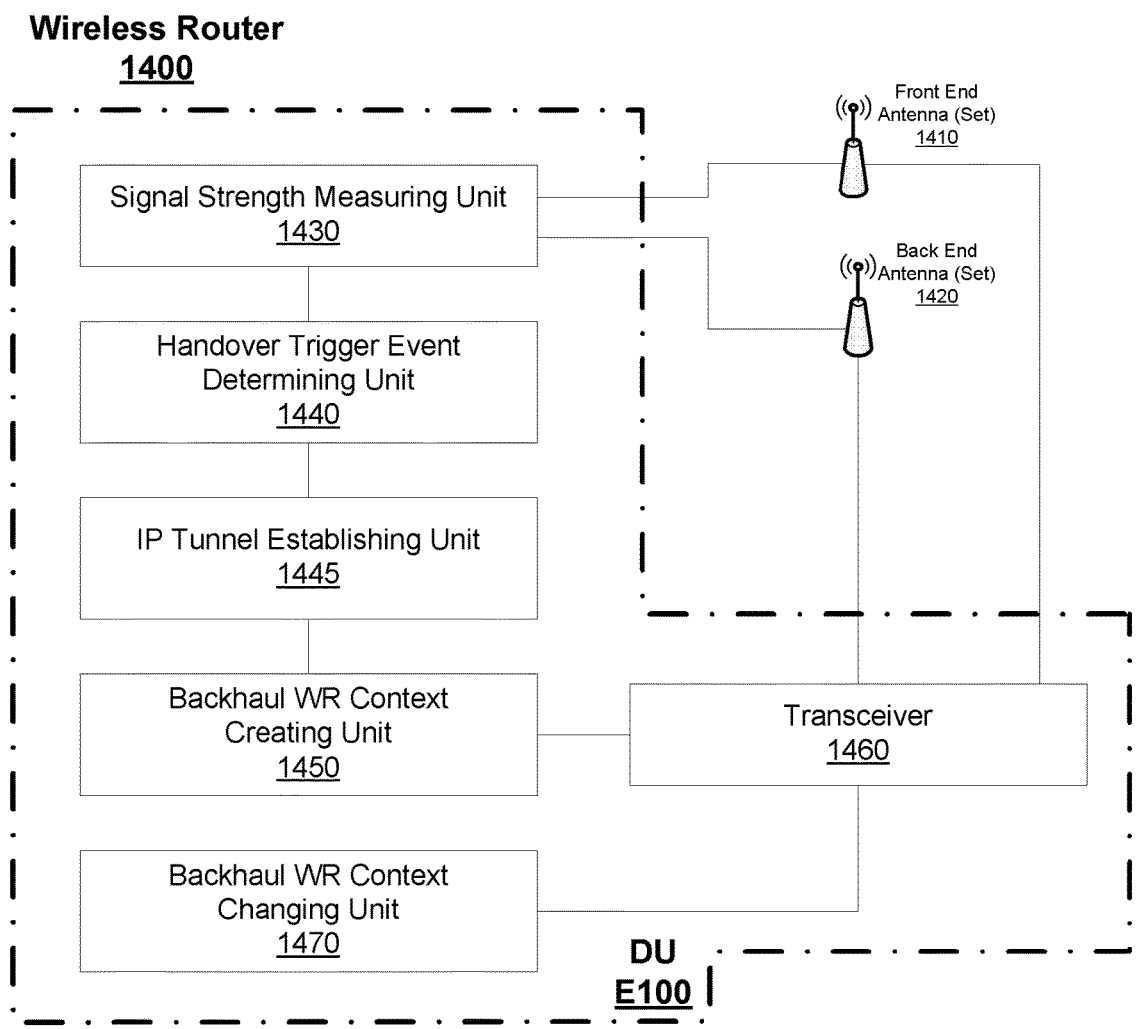
FIG. 14 shows a block diagram of a Wireless Router 1400 according to the present disclosure.

FIG. 14 shows a block diagram of a Wireless Router 1400 according to the present disclosure.

As shown in FIG. 14, the Wireless Router 1400 includes a first antenna (set) 1410, a second antenna (set) 1420, and a digital unit (DU) E100. DU E100 may include a signal strength measuring unit 1430, a handover trigger event determining unit 1440, an IP tunnel establishing unit 1445, a backhaul WR context creating unit 1450, a transceiver 1460, and a backhaul WR context changing unit 1470.

The first antenna (set) 1410 and the second antenna (set) 1420 are separated with a distance (for example, on a cart of a high-speed train). Per the distance between these two antennas (sets) 1410 and 1420, the present invention is not limited to any specific value. As a non-limiting example, the distance is no more than a distance between two adjacent on-land base stations. As another non-limiting example, the second antenna (set) 1420 is ahead of the first antenna (set) 1410 in the heading direction of movement of the train.

DU E100 is connected to the first and second antennas (sets) 1410 and 1420 so that DU E100 can support at least one backhaul WR context with the first antenna (set) 1410 and at least another backhaul WR context with the second antenna (set) 1420 at the same time. The detailed operations of respective units included in DU E100 will be described hereunder.

The signal strength measuring unit 1430 is used to measure signal strengths heard by the second antenna 1420 from a source donor cell and a target donor cell. Also, the signal strength measuring unit 1430 can be used to measure signal strengths heard by the first antenna 1410 from the source donor cell and the target donor cell. UE is being served by the Wireless Router 1400 with a first backhaul WR context communicated by the first antenna 1410 via a first IP tunnel. The first IP tunnel is established between the first antenna 1410 and a WR-GW through the source donor cell. The first IP tunnel may include a first radio bearer between the first antenna 1410 and a source BS serving the source donor cell and a GTP tunnel between the source BS and the WR-GW.

The handover trigger event determining unit 1440 is used to determine that a handover trigger event occurs based on signal strength measurements from the signal strength measuring unit 1430.

The IP tunnel establishing unit 1445 is used to establish a second IP tunnel between the second antenna 1420 and the WR-GW through the target donor cell. The establishment of the second IP tunnel may include establishing a second radio bearer between the second antenna 1420 and a target BS serving the target donor cell and establishing a GTP tunnel between the target BS and the WR-GW. The source BS and the target BS may be one and the same BS (intra-BS handover) or different BSs (inter-BS handover).

The backhaul WR context creating unit 1450 is used to create a second backhaul WR context communicated by the second antenna 1420 via the second IP tunnel.

The transceiver 1460 can be used to transmit and receive user plane data packets and/or control plane data packets to and from WR-GW (via donor cells (BSs)). In connection with the present invention, for example, the transceiver 1460 inter alia can be used to send an IP tunnel change request to the WR-GW and to receive an IP tunnel change response from the WR-GW. The IP tunnel change request may include at least one of TFT Identity and Target IP Tunnel Identity.

The backhaul WR context changing unit 1470 is used to change, for the UE, the first backhaul WR context to the second backhaul WR context, after the IP tunnel change response is received by the transceiver 1460. After the backhaul WR context change, the UE is now being served by the Wireless Router 1400 with the second backhaul WR context communicated by the second antenna 1420 via the second IP tunnel (being established between the second antenna 1420 and the WR-GW through the target donor cell).

Mobility Method Performed by Wireless Router

Figure 15:
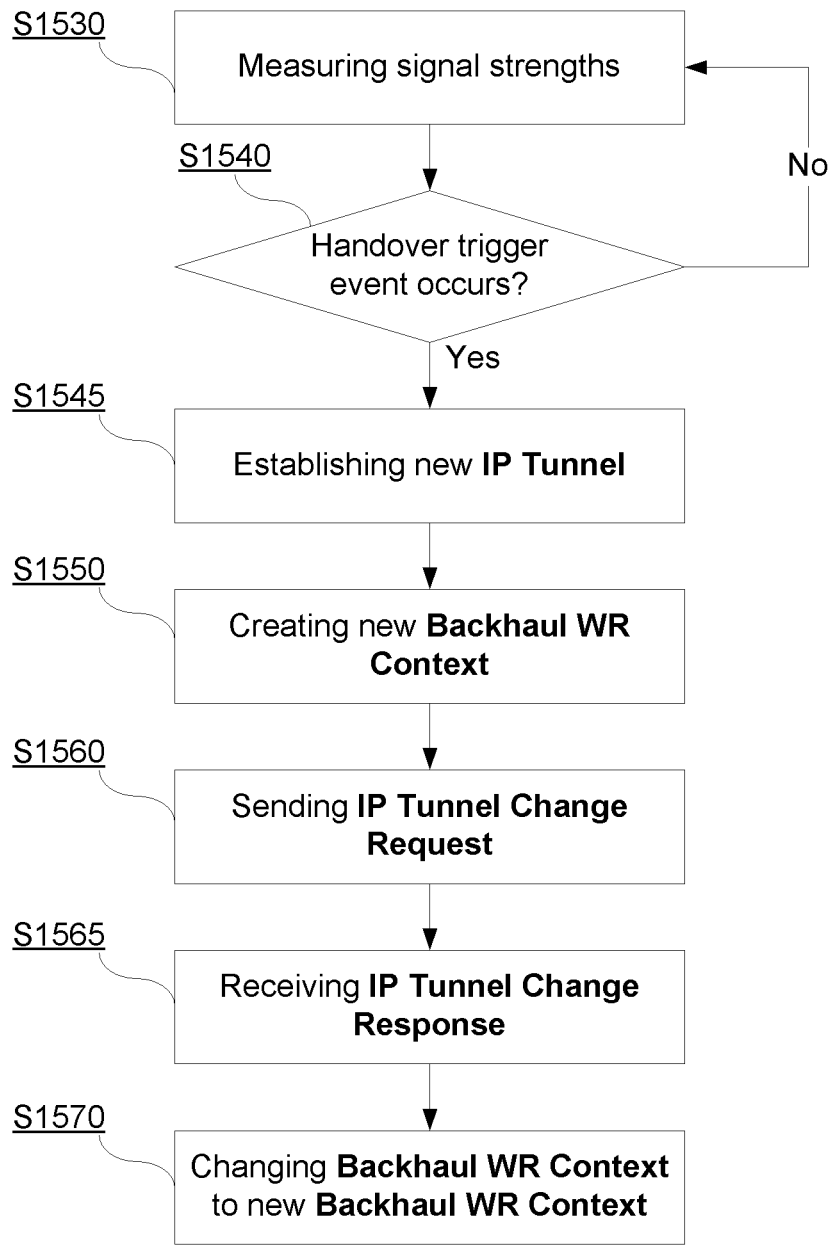
FIG. 15 shows a flowchart of a mobility method performed by the Wireless Router 1400 according to the present disclosure.

FIG. 15 shows a flowchart of a mobility method performed by the Wireless Router 1400 according to the present disclosure.

As shown in FIG. 15, in step S1530, signal strengths heard by the second antenna 1420 from a source donor cell and a target donor cell are measured by the signal strength measuring unit 1430. Now, UE is being served by the Wireless Router 1400 with a first backhaul WR context communicated by the first antenna 1410 via a first IP tunnel. The first IP tunnel is established between the first antenna 1410 and a WR-GW through the source donor cell. The first IP tunnel may include a first radio bearer between the first antenna 1410 and a source BS serving the source donor cell and a GTP tunnel between the source BS and the WR-GW.

In step S1540, it is determined by the handover trigger event determining unit 1440 whether a handover trigger event occurs based on signal strength measurements from the signal strength measuring unit 1430.

In step S1545, a second IP tunnel is established by the IP tunnel establishing unit 1445 between the second antenna 1420 and the WR-GW through the target donor cell. The establishment of the second IP tunnel may include establishing a second radio bearer between the second antenna 1420 and a target BS serving the target donor cell and establishing a GTP tunnel between the target BS and the WR-GW. The source BS and the target BS may be one and the same BS (intra-BS handover) or different BSs (inter-BS handover).

In step S1550, a second backhaul WR context communicated by the second antenna 1420 via the second IP tunnel is created by the backhaul WR context creating unit 1450.

After the creation of the second backhaul WR context, an IP tunnel change request is sent to the WR-GW for each UE by the transceiver 1460 in step S1560. In step S1565, an IP tunnel change response is received from the WR-GW corresponding to each IP tunnel change request by the transceiver 1460.

In step S1570, for the UE, the serving backhaul WR Context is changed from the first backhaul WR context to the second backhaul WR context by the backhaul WR context changing unit 1470, after the IP tunnel change response is received by the transceiver 1460. After the backhaul WR context change, the UE is now being served by the Wireless Router 1400 with the second backhaul WR context communicated by the second antenna 1420 via the second IP tunnel (being established between the second antenna 1420 and the WR-GW through the target donor cell).

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

3GPP 3$^{rd}$ Generation Partnership Project
AFC Automatic Frequency Control
BS Base Station
C-RNTI Cell Radio Network Temporary Identity
CDMA Code Division Multiple Access
DeNB Donor eNB
DL Downlink
DU Digital Unit
E-RAB E-UTRAN Radio Access Bearer
ECGI E-UTRAN Cell Global Identifier
ECM EPS Connection Management
EPS Evolved Packet System
eNB E-UTRAN Node B
E-UTRAN Evolved Universal Terrestrial Radio Access Network
GGSN Gateway GPRS Support Node
GINR Gain to Interference plus Noise Ratio
GPRS General Packet Radio Service
GTP GPRS Tunneling Protocol
GTP-U GPRS Tunneling Protocol User Plane
GW Gateway
ID Identification
IP Internet Protocol
LTE Long Term Evolution
MIMO Multiple Input Multiple Output
MME Mobility Management Entity
MU Multiple User
PDN Packet Data Network
RAN Radio Access Network
RN Relay Node
RRC Radio Resource Control
S1AP S1 Application Protocol
SCTP Stream Control Transmission Protocol
SGSN Serving GPRS Support Node
SGW Serving Gateway
S/P-GW Serving/PDN Gateway
TAU Tracking Area Update
TD-SCDMA Time Division Synchronous Code Division Multiple Access
TEID Tunnel Endpoint Identifier
TFA Traffic Flow Aggregate
TFT Traffic Flow Template
TLA Transport Layer Address
UE User Equipment
UL Uplink
UTRAN Universal Terrestrial Radio Access Network
WCDMA Wideband Code Division Multiple Access
WR Wireless Router
WR-GW Wireless Router Gateway

REFERENCES

[1] RP-110894, 3GPP TSG RAN#52, May 31-Jun. 3, 2011;
[2] 3GPP TS 36.806 V9.0.0, March, 2010; and
[3] 3GPP TS 36.331 V9.10.0, March, 2012.

What is claimed is:

1. A communication apparatus for use as a relay node (RN) between base stations (BSs) and a user equipment (UE) comprising:
 a first antenna and a second antenna separated with a distance; and
 a digital device connected to the first and second antennas and configured to support at least one backhaul context with the first antenna and at least another backhaul context with the second antenna at the same time, wherein the digital device causes the RN to perform operations to:

measure signal strengths heard by the second antenna from a source donor cell and a target donor cell, wherein the UE is being served by the communication apparatus with a first backhaul RN context communicated by the first antenna with the source donor cell;

determine that a handover trigger event occurs based on signal strength measurements;

create, for the target donor cell, a second backhaul RN context communicated by the second antenna with the target donor cell;

send a backhaul RN context change request to the source donor cell and to receive a backhaul RN context change response from the target donor cell; and change, for the UE, the first backhaul RN context to the second backhaul RN context, after the backhaul RN context change response is received.

2. The communication apparatus of claim 1, wherein the backhaul RN context change request includes at least one of a Relay Cell Identification (ID), a Relay Node UE ID, a second backhaul RN context ID, and a target donor cell ID.

3. The communication apparatus of claim 1, wherein the digital device further causes the RN to perform operations to release a Radio Resource Control (RRC) connection between the first antenna and the source donor cell after all UE served by the communication apparatus with the first backhaul RN context are handed over to the second backhaul RN context.

4. The communication apparatus of claim 1, wherein the source donor cell and the target donor cell are served by the same BS.

5. The communication apparatus of claim 1, wherein
the source donor cell and the target donor cell are served by different BSs under the same mobility management entity, and
the communication apparatus further updates an Uplink Transport Layer Address/General Packet Radio Service (GPRS) Tunneling Protocol User Plane Tunnel Endpoint Identifier (UL TLA/GTP-U TEID) for each Evolved Universal Terrestrial Radio Access Network (E-UTRAN) Radio Access Bearer (E-RAB).

6. The communication apparatus of claim 1, wherein
the source donor cell and the target donor cell are served by different BS s under different mobility management entities, and the communication apparatus further updates an Uplink Transport Layer Address/General Packet Radio Service (GPRS) Tunneling Protocol User Plane Tunnel Endpoint Identifier (UL TLA/GTP-U TEID) for each Evolved Universal Terrestrial Radio Access Network (E-UTRAN) Radio Access Bearer (E-RAB).

7. The communication apparatus of claim 5, wherein the backhaul RN context change response includes at least one of Relay Node UE Identification (ID) and UL TLA/GTP-U TEID over Un port for each E-RAB.

8. A mobility method for a communication apparatus with a first antenna and a second antenna separated with a distance and in which the communication apparatus is configured to operate as a relay node (RN) between base stations (BS) and a user equipment (UE), the mobility method comprising:

measuring signal strengths heard by the second antenna from a source donor cell and a target donor cell, wherein a UE is being served by the communication apparatus with a first backhaul RN context communicated by the first antenna with the source donor cell;

determining that a handover trigger event occurs based on signal strength measurements;

creating, for the target donor cell, a second backhaul RN context communicated by the second antenna with the target donor cell;

sending a backhaul RN context change request to the source donor cell;

receiving a backhaul RN context change response from the target donor cell; and changing, for the UE, the first backhaul RN context to the second RN backhaul context, after the backhaul RN context change response is received to support at least one backhaul context with the first antenna and at least another backhaul context with the second antenna at the same time.

9. The mobility method of claim 8, wherein the backhaul RN context change request includes at least one of a Relay Cell Identification (ID), a Relay Node UE ID, a second backhaul RN context ID, and a target donor cell ID.

10. The mobility method of claim 8, further comprising:
releasing a Radio Resource Control (RRC) connection between the first antenna and the source donor cell after all UE served by the communication apparatus with the first backhaul RN context are handed over to the second backhaul RN context.

* * * * *